US009697557B2

(12) United States Patent
Quinn

(10) Patent No.: US 9,697,557 B2
(45) Date of Patent: *Jul. 4, 2017

(54) SYSTEM AND METHOD OF ELECTRONIC SEARCHING AND SHOPPING CARTS

(71) Applicant: Blake Quinn, Fontana, CA (US)

(72) Inventor: Blake Quinn, Fontana, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 14/690,374

(22) Filed: Apr. 18, 2015

(65) Prior Publication Data

US 2015/0348168 A1  Dec. 3, 2015

Related U.S. Application Data

(60) Provisional application No. 62/004,104, filed on May 28, 2014.

(51) Int. Cl.
*G06Q 30/00* (2012.01)
*G06Q 30/06* (2012.01)
*G06Q 30/02* (2012.01)
*G06F 17/30* (2006.01)

(52) U.S. Cl.
CPC ... *G06Q 30/0633* (2013.01); *G06F 17/30864* (2013.01); *G06Q 30/0256* (2013.01); *G06Q 30/0625* (2013.01); *G06Q 30/0643* (2013.01)

(58) Field of Classification Search
CPC .................. G06Q 30/06; G06Q 30/0633
See application file for complete search history.

(56) References Cited

U.S. PATENT DOCUMENTS

| 6,029,141 A | 2/2000 | Bezos et al. |
| 7,162,443 B2 * | 1/2007 | Shah .......................... 705/26.35 |
| 7,165,264 B1 | 1/2007 | Westrick |

(Continued)

FOREIGN PATENT DOCUMENTS

| CN | 103177081 A | 6/2013 |
| WO | WO 2008/002993 A2 | 1/2008 |

OTHER PUBLICATIONS

U.S. Office action dated Jul. 24, 2015, corresponding to U.S. Appl. No. 14/690,375, 36 pages.

(Continued)

*Primary Examiner* — Naeem Haq
(74) *Attorney, Agent, or Firm* — Thomas J. Daly; Lewis Roca Rothgerber Christie LLP

(57) ABSTRACT

A system of electronic shopping with an electronic shopping cart includes a computer processor, a network interface configured to connect the processor to an electronic shopping site and to shop at the shopping site using the electronic shopping cart, an input device configured to receive search string input from a user, a display device configured to display search string preview results to the user as the user enters the search string input in the input device, and a non-transitory physical medium. The medium has instructions stored thereon that, when executed by the processor, causes the processor to receive from the input device a partial search string entered by the user, display on the display device relevant search string preview results from the shopping site based on the partial search string, and display on the display device contents of the shopping cart concurrently with the displayed search string preview results.

16 Claims, 14 Drawing Sheets

(56) References Cited

U.S. PATENT DOCUMENTS

| | | | |
|---|---|---|---|
| 7,676,517 | B2 | 3/2010 | Hurst-Hiller et al. |
| 8,156,125 | B2 | 4/2012 | Annau et al. |
| 8,260,771 | B1 * | 9/2012 | Ortega et al. ............... 707/723 |
| 8,438,166 | B1 | 5/2013 | Treder |
| 8,504,437 | B1 * | 8/2013 | Agarwal et al. ............ 705/26.3 |
| 2002/0010639 | A1 | 1/2002 | Howey et al. |
| 2002/0023084 | A1 | 2/2002 | Eyal et al. |
| 2002/0156685 | A1 * | 10/2002 | Ehrlich et al. ................. 705/26 |
| 2003/0163390 | A1 | 8/2003 | Yang |
| 2004/0139001 | A1 | 7/2004 | Henriques et al. |
| 2005/0149390 | A1 | 7/2005 | Scholl et al. |
| 2006/0282416 | A1 | 12/2006 | Gross et al. |
| 2007/0089068 | A1 | 4/2007 | Alexander et al. |
| 2007/0129997 | A1 | 6/2007 | Davies |
| 2007/0203747 | A1 | 8/2007 | Baharloo et al. |
| 2009/0043660 | A1 | 2/2009 | Lee |
| 2009/0049383 | A1 | 2/2009 | Haynes et al. |
| 2009/0089678 | A1 | 4/2009 | Sacco et al. |
| 2009/0144234 | A1 | 6/2009 | Sharif et al. |
| 2011/0022635 | A1 | 1/2011 | Michael et al. |
| 2012/0030226 | A1 | 2/2012 | Holt et al. |
| 2012/0265744 | A1 | 10/2012 | Berkowitz et al. |
| 2013/0086509 | A1 | 4/2013 | Satyanarayana et al. |
| 2013/0254069 | A1 | 9/2013 | Altendorf et al. |
| 2013/0254308 | A1 | 9/2013 | Rose et al. |
| 2014/0258004 | A1 | 9/2014 | Alves |

OTHER PUBLICATIONS

International Search Report and the Written Opinion of the International Searching Authority for PCT/US2015/033061, mailing date Sep. 18, 2015, 11 pages.
Bustos, Linda, Trendspotting: Rich Autocomplete in Site Search, Sep. 25, 2009, http://www.getelastic.com/trendspotting-rich-autocomplete-in-site-search/, 6 pages.
Search AutoComplete Magento Extension with screen shots, Oct. 4, 2011, (via wayback machine), author unknown, Mageworx, http://www.mageworx.com/search-autocomplete-magento-extension.html, 7 pages.
ECommerce Site Search, (via wayback machine), author unknown, Nextopia, Sep. 19, 2012, http://nextopia.com/ecommerce-site-search.html, 5 pages.
How to provide autocomplete and autosuggest on the same search box at the same time, May 15, 2013, author unknown, StackExchange, http://ux.stackexchange.com/questions/40104/how-to-provide-autocomplete-and-autosuggest-on-the-same-search-box-at-the-same-t, 2 pages.
Searchify—Rich Autocomplete for Shopify, author unknown, Shopify Mar. 22, 2010, http://www.shopifyconcierge.com/blogs/news/1316042-searchify-rich-autocomplete-for-shopify, 2 pages.
SLI Systems Site Search Video Tips—Rich Auto Complete, author unknown, YouTube Dec. 14, 2010, http://www.youtube.com/watch?v=55fT0UdxSIs, 2 pages.
RichFaces 4 Overview. Part IV—Inputs Components, (via wayback machine), author unknown, RichFaces Nov. 30, 2010, http://in.relation.to/Bloggers/RichFaces4OverviewPartIVInPutsComponents, 5 pages.
Nextopia Enhanced Autocomplete, retrieved, author unknown, Nextopia Jan. 20, 2014, http://www.nextopia.com/enhanced-autocomplete.html?gclid=CP2FsJri6bsCFc07Ogod43MASw, 2 pages.
Quick View and Zoom, (via wayback machine), author unknown, Nextopia Sep. 19, 2012, http://nextopia.com/ecommerce-site-search.html, 1 page.

* cited by examiner

FIG. 3

SYSTEM AND METHOD OF ELECTRONIC SEARCHING AND SHOPPING CARTS

CROSS-REFERENCE TO RELATED APPLICATION

This application claims priority to and the benefit of Provisional Application No. 62/004,104, filed on May 28, 2014, the entire content of which is incorporated herein by reference.

BACKGROUND

1. Field (1)

Aspects of embodiments of the present invention are directed toward a system and method of electronic searching and shopping carts.

2. Description of the Related Art

Electronic commerce (or e-commerce) is a rapidly growing model for transacting business. Using simple tools like a web browser, customers can carry out transactions via their computers, smart phones, tablets, and other computing devices. Search boxes are a common feature in e-commerce web sites (as well as being the primary interface to computer search engines), allowing customers to find particular products or services by coming up with key words (such as a brand name or description) to describe them. General search engines and browsers have similar features.

E-commerce site frequently use electronic shopping carts to hold items that a customer is contemplating purchasing. Customers select "Add to Cart" on an item that they are interested in, and then can purchase the items accumulated in the shopping cart by selecting a "Proceed to Checkout" option on the e-commerce site. In addition, advertisers are always looking for ways to better target potential customers, particularly in the e-commerce and other electronic network (such as the Internet) applications (including search engines, browsers, etc.) Because of the growing use of e-commerce web sites, improvements to the shopping experience, such as improvements to the search boxes or shopping carts, as well as improvements to search engines and advertising in general, are being sought after.

SUMMARY

Aspects of embodiments of the present invention are directed toward electronic shopping, searching, and browsing, such as with e-commerce, electronic searching, and browsing (e.g., Internet browsing). Further aspects are directed to electronic shopping and searching, and to electronic shopping carts and e-commerce search boxes. Still further aspects are directed to browsers or general search engines. By way of example, some embodiments of the present invention are directed to conducting business with customers via an e-commerce web site. Further embodiments are directed to techniques of displaying search results, shopping carts, web pages (such as product or service pages), etc., without loading the actual web pages.

Additional aspects of embodiments of the present invention are directed toward advertising in connection with electronic shopping, searching, and browsing, such as with e-commerce, electronic searching, and browsing (e.g., Internet browsing). Further aspects are directed to advertising in connection with electronic shopping and searching, and to electronic shopping carts and e-commerce search boxes. Still further aspects are directed to browsers or general search engines.

In an embodiment of the present invention, a system of electronic shopping with an electronic shopping cart is provided. The system includes a computer processor, a network interface configured to connect the processor to an electronic shopping site and to shop at the shopping site using the electronic shopping cart, an input device configured to receive search string input from a user, a display device configured to display search string preview results to the user as the user enters the search string input in the input device, and a non-transitory physical medium. The medium has instructions stored thereon that, when executed by the processor, causes the processor to receive from the input device a partial search string entered by the user, display on the display device relevant search string preview results from the shopping site based on the partial search string, and display on the display device contents of the shopping cart concurrently with the displayed search string preview results.

The instructions, when executed by the processor, may further cause the processor to receive from the input device a selection by the user of one of the displayed search string preview results to add to the shopping cart, update the shopping cart to incorporate the user's selection into the shopping cart, and update on the display device the displayed contents of the shopping cart to reflect the user's selection concurrently with the displayed search string preview results.

The instructions, when executed by the processor, may further cause the processor to receive from the input device a further portion of the partial search string entered by the user, and update on the display device the relevant search string preview results from the shopping site based on the received further portion of the partial search string while maintaining the concurrent displaying of the contents of the shopping cart.

The instructions, when executed by the processor, may further cause the processor to receive from the input device a selection by the user of one of the displayed contents of the shopping cart to remove from the shopping cart, update the shopping cart to remove the user's selection from the shopping cart, and update on the display device the displayed contents of the shopping cart to reflect the user's selection concurrently with the displayed search string preview results.

The system may further include a plurality of electronic shopping carts including the shopping cart. The instructions, when executed by the processor, may further cause the processor to display on the display device a list of one or more of the electronic shopping carts including the shopping cart concurrently with the displayed search string preview results and contents of the shopping cart, receive from the input device a selection by the user of one of the electronic shopping carts different from the shopping cart, update the shopping cart to reflect the selected one of the electronic shopping carts; and update on the display device the displayed contents of the shopping cart to reflect the selected one of the electronic shopping carts.

The instructions, when executed by the processor, may further cause the processor to receive from the input device a selection by the user to proceed to checkout processing of the shopping cart from within the displayed contents of the shopping cart concurrently with the displayed search string preview results, and proceed to the checkout processing of the shopping cart.

The displayed contents of the shopping cart may be too large to display in a designated portion of the display device. The instructions, when executed by the processor, further cause the processor to display on the designated portion of the display device a first portion of the contents of the shopping cart concurrently with the displayed search string preview results, receive from the input device a selection by the user to display further contents of the shopping cart, and display on the designated portion of the display device a second portion different from the first portion of the contents of the shopping cart concurrently with the displayed search string preview results.

The displayed search string preview results may be too large to display in a designated portion of the display device. The instructions, when executed by the processor, may further cause the processor to display on the designated portion of the display device a first portion of the search string preview results concurrently with the displayed contents of the shopping cart, receive from the input device a selection by the user to display further search string preview results, and display on the designated portion of the display device a second portion different from the first portion of the search string preview results concurrently with the displayed contents of the shopping cart.

In another embodiment of the present invention, a method of electronic shopping with an electronic shopping cart on a system including a computer processor, a network interface configured to connect the processor to an electronic shopping site and to shop at the shopping site using the electronic shopping cart, an input device configured to receive search string input from a user, and a display device configured to display search string preview results to the user as the user enters the search string input in the input device is provided. The method includes receiving by the processor from the input device a partial search string entered by the user, displaying by the processor on the display device relevant search string preview results from the shopping site based on the partial search string, and displaying by the processor on the display device contents of the shopping cart concurrently with the displayed search string preview results.

The method may further include receiving by the processor from the input device a selection by the user of one of the displayed search string preview results to add to the shopping cart, updating by the processor the shopping cart to incorporate the user's selection into the shopping cart, and updating by the processor on the display device the displayed contents of the shopping cart to reflect the user's selection concurrently with the displayed search string preview results.

The method may further include receiving by the processor from the input device a further portion of the partial search string entered by the user, and updating by the processor on the display device the relevant search string preview results from the shopping site based on the received further portion of the partial search string while maintaining the concurrent displaying of the contents of the shopping cart.

The method may further include receiving by the processor from the input device a selection by the user of one of the displayed contents of the shopping cart to remove from the shopping cart, updating by the processor the shopping cart to remove the user's selection from the shopping cart, and updating by the processor on the display device the displayed contents of the shopping cart to reflect the user's selection concurrently with the displayed search string preview results.

The system may further include a plurality of electronic shopping carts including the shopping cart. The method may further include displaying on the display device a list of one or more of the electronic shopping carts including the shopping cart concurrently with the displayed search string preview results and contents of the shopping cart, receiving from the input device a selection by the user of one of the electronic shopping carts different from the shopping cart, updating the shopping cart to reflect the selected one of the electronic shopping carts, and updating on the display device the displayed contents of the shopping cart to reflect the selected one of the electronic shopping carts.

The method may further include receiving by the processor from the input device a selection by the user to proceed to checkout processing of the shopping cart from within the displayed contents of the shopping cart concurrently with the displayed search string preview results, and proceeding to the checkout processing of the shopping cart.

The displayed contents of the shopping cart may be too large to display in a designated portion of the display device. The method may further include displaying by the processor on the designated portion of the display device a first portion of the contents of the shopping cart concurrently with the displayed search string preview results, receiving by the processor from the input device a selection by the user to display further contents of the shopping cart, and displaying by the processor on the designated portion of the display device a second portion different from the first portion of the contents of the shopping cart concurrently with the displayed search string preview results.

The displayed search string preview results may be too large to display in a designated portion of the display device. The method may further include displaying by the processor on the designated portion of the display device a first portion of the search string preview results concurrently with the displayed contents of the shopping cart, receiving by the processor from the input device a selection by the user to display further search string preview results, and displaying by the processor on the designated portion of the display device a second portion different from the first portion of the search string preview results concurrently with the displayed contents of the shopping cart.

In yet another embodiment of the present invention, a system of electronic searching and advertising is provided. The system includes a computer processor, a network interface configured to connect the processor to a search box of a network application, an input device configured to receive search string input from a user, a display device configured to display search string preview results of the network application to the user as the user enters the search string input in the input device, and a non-transitory physical medium. The medium has instructions stored thereon that, when executed by the processor, causes the processor to receive from the input device a partial search string entered by the user, display on the display device relevant search string preview results from the network application based on the partial search string, and display on the display device an advertisement as an extension of the search box concurrently with the displayed search string preview results.

The advertisement may be relevant to the entered partial search string.

The instructions, when executed by the processor, may further cause the processor to receive from the input device a further portion of the partial search string entered by the user, update on the display device the relevant search string preview results from the network application based on the received further portion of the partial search string, and update on the display device the advertisement to a different advertisement based on the received further portion of the partial search string.

The advertisement may be relevant to the entered partial search string and the different advertisement may be relevant to the entered further portion of the partial search string.

The displayed search string preview results may be too large to display in a designated portion of the display device. The instructions, when executed by the processor, may further cause the processor to display on the designated portion of the display device a first portion of the search string preview results concurrently with the advertisement, receive from the input device a selection by the user to display further search string preview results, and display on the designated portion of the display device a second portion different from the first portion of the search string preview results concurrently with the advertisement.

The advertisement may appear in a form similar to the search string preview results.

The advertisement may appear with a sponsored advertisement identification.

The advertisement may appear at a top of the displayed search string preview results.

The network application may be an electronic commerce site.

The advertisement may be for a product or service for sale on the electronic commerce site.

The network application may be a network search engine.

The network application may be a web browser.

The network application may be a smartphone app.

In still yet another embodiment of the present invention, a method of electronic searching and advertising on a system including a computer processor, a network interface configured to connect the processor to a search box of a network application, an input device configured to receive search string input from a user, and a display device configured to display search string preview results of the network application to the user as the user enters the search string input in the input device is provided. The method includes receiving by the processor from the input device a partial search string entered by the user, displaying by the processor on the display device relevant search string preview results from the network application based on the partial search string, and displaying by the processor on the display device an advertisement as an extension of the search box concurrently with the displayed search string preview results.

The advertisement may be relevant to the entered partial search string.

The method may further include receiving by the processor from the input device a further portion of the partial search string entered by the user, updating by the processor on the display device the relevant search string preview results from the network application based on the received further portion of the partial search string, and updating by the processor on the display device the advertisement to a different advertisement based on the received further portion of the partial search string.

The advertisement may be relevant to the entered partial search string and the different advertisement may be relevant to the entered further portion of the partial search string.

The displayed search string preview results may be too large to display in a designated portion of the display device. The method may further include displaying by the processor on the designated portion of the display device a first portion of the search string preview results concurrently with the advertisement, receiving by the processor from the input device a selection by the user to display further search string preview results, and displaying by the processor on the designated portion of the display device a second portion different from the first portion of the search string preview results concurrently with the advertisement.

The advertisement may appear in a form similar to the search string preview results.

The advertisement may appear with a sponsored advertisement identification.

The advertisement may appear at a top of the displayed search string preview results.

The above and other embodiments of the present invention are directed to enhancements in the e-commerce (such as electronic shopping carts and search boxes) and general search engine or browser interfaces. Embodiments of the present invention may improve the electronic shopping experience and allow advertisers to better reach their target audiences.

BRIEF DESCRIPTION OF THE DRAWINGS

The accompanying drawings, together with the specification, illustrate example embodiments of the present invention. These drawings, together with the description, serve to better explain aspects and principles of the present invention.

FIG. 3 is a screenshot of an example implementation of accessing more search results according to an embodiment of the present invention.

DETAILED DESCRIPTION

Figure 1:
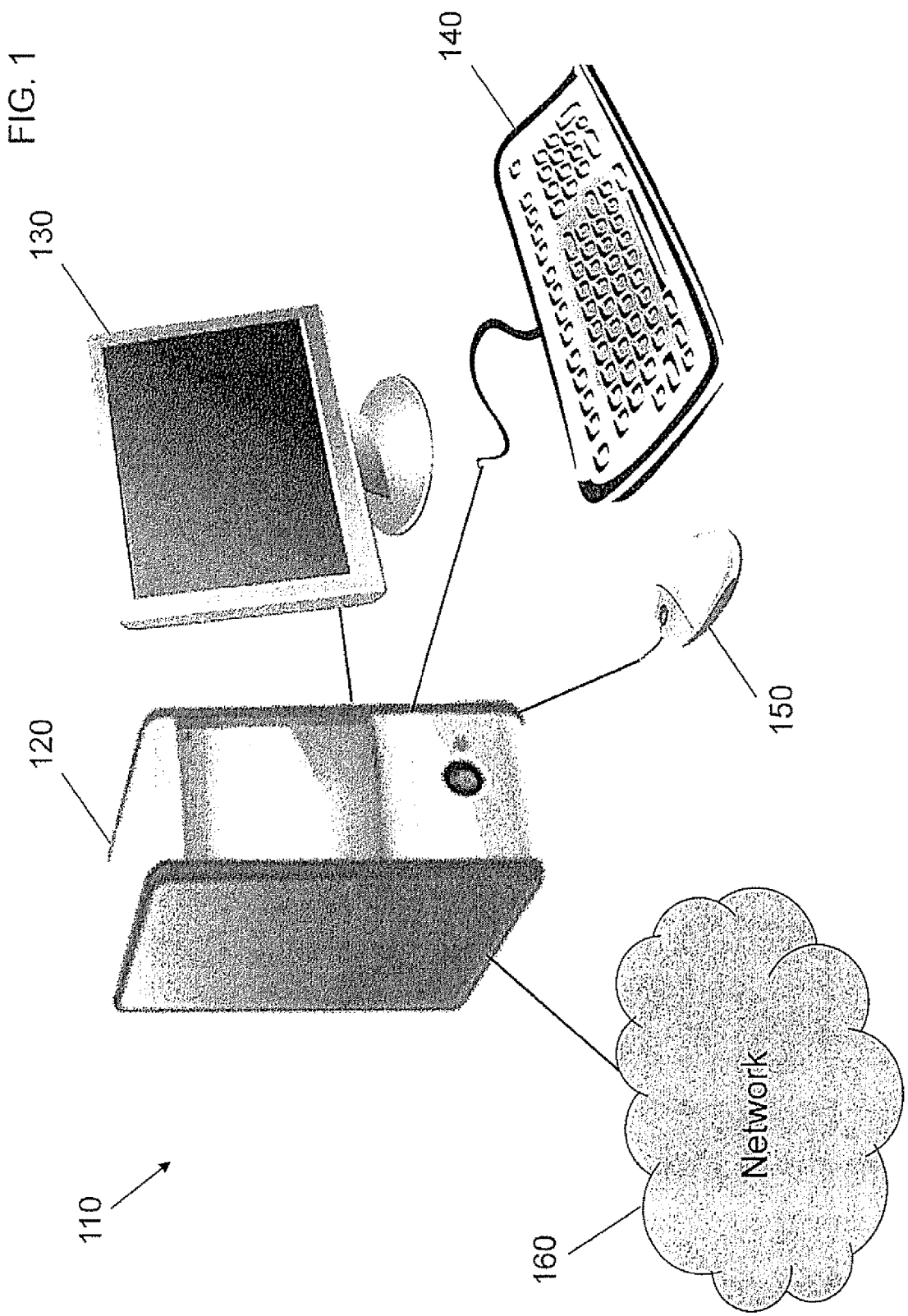
FIG. 1 is an example system for doing electronic searching and shopping as well as electronic searching and advertising according to an embodiment of the present invention.

Example embodiments of the present invention will now be described with reference to the accompanying drawings.

In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

The system and method of electronic searching and shopping carts as well as electronic searching and advertising and/or any other relevant devices or components according to embodiments of the present invention described herein may be implemented utilizing any suitable hardware, firmware (e.g., an application-specific integrated circuit), software, or a suitable combination of software, firmware, and hardware. Further, the various components of the system and method of electronic searching and shopping carts as well as electronic searching and advertising may be a process or thread, running on one or more processors, in one or more computing devices, executing computer program instructions and interacting with other system components for performing the various functionalities described herein.

The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. In addition, a person of skill in the art should recognize that the functionality of various computing devices may be combined or integrated into a single computing device, or the functionality of a particular computing device may be distributed across one or more other computing devices without departing from the scope of the present invention.

Embodiments of the present invention are directed toward electronic searching and shopping as well as electronic searching and advertising, for example, with computer search engines, browsers, electronic commerce (e-commerce) sites, and other applications. For ease of description, many of the example embodiments described relate to e-commerce sites, but the concepts are easily extendible to other computer applications and platforms (such as smartphones, laptop computers, tablets, etc.) as would be apparent to one of ordinary skill.

FIG. 1 is an example system 110 for doing electronic searching and shopping as well as electronic searching and advertising according to an embodiment of the present invention.

System 110 includes a computer 120 (such as a personal computer), including a processor, memory, and a nonvolatile (or non-transitory) storage device (such as a disk drive) or other physical medium. The processor may be, for example, a microprocessor having one or more processing cores, and configured to execute computer instructions (such as from a computer program) and access data stored in the memory. The programs and data may be stored on a more permanent basis in the nonvolatile storage device. The system 110 further includes additional hardware input/output (I/O) devices, such as a monitor 130 or other display device, a keyboard 140 or other input device (such as a touch screen), and a mouse 150 or other pointing device (which may also be part of a touchscreen).

The system 110 may further be connected to a network 160, such as the Internet, from which it may access websites (such as e-commerce websites or search engines) through a browser. By way of example, the system 110 may conduct electronic shopping (such as with an electronic shopping cart) through an e-commerce website (such as an electronic shopping site), conduct electronic searching of the network 160 through a search engine, or conduct electronic browsing of the network 160 with a browser.

The computer 120 may run programs, such as programs according to embodiments of the present invention, on the processor. The programs may accept input from, for example, from an input device such as the keyboard 140 or mouse 150 (or a touchscreen), and display output (such as search results) on the monitor 130. The programs may add or modify interfaces (such as existing interfaces) to search engines, browsers, e-commerce websites (including electronic shopping and shopping carts). The additions or modifications may be implemented, for example, as a series of computer instructions through software, firmware, etc., as would be apparent to one of ordinary skill. The instructions may be bundled as programs and made available on a non-transitory storage medium, such as a disk, e.g., compact disc (CD), digital video disc (DVD).

Show Search Results in Search Box (Search-Ahead)

Figure 2:
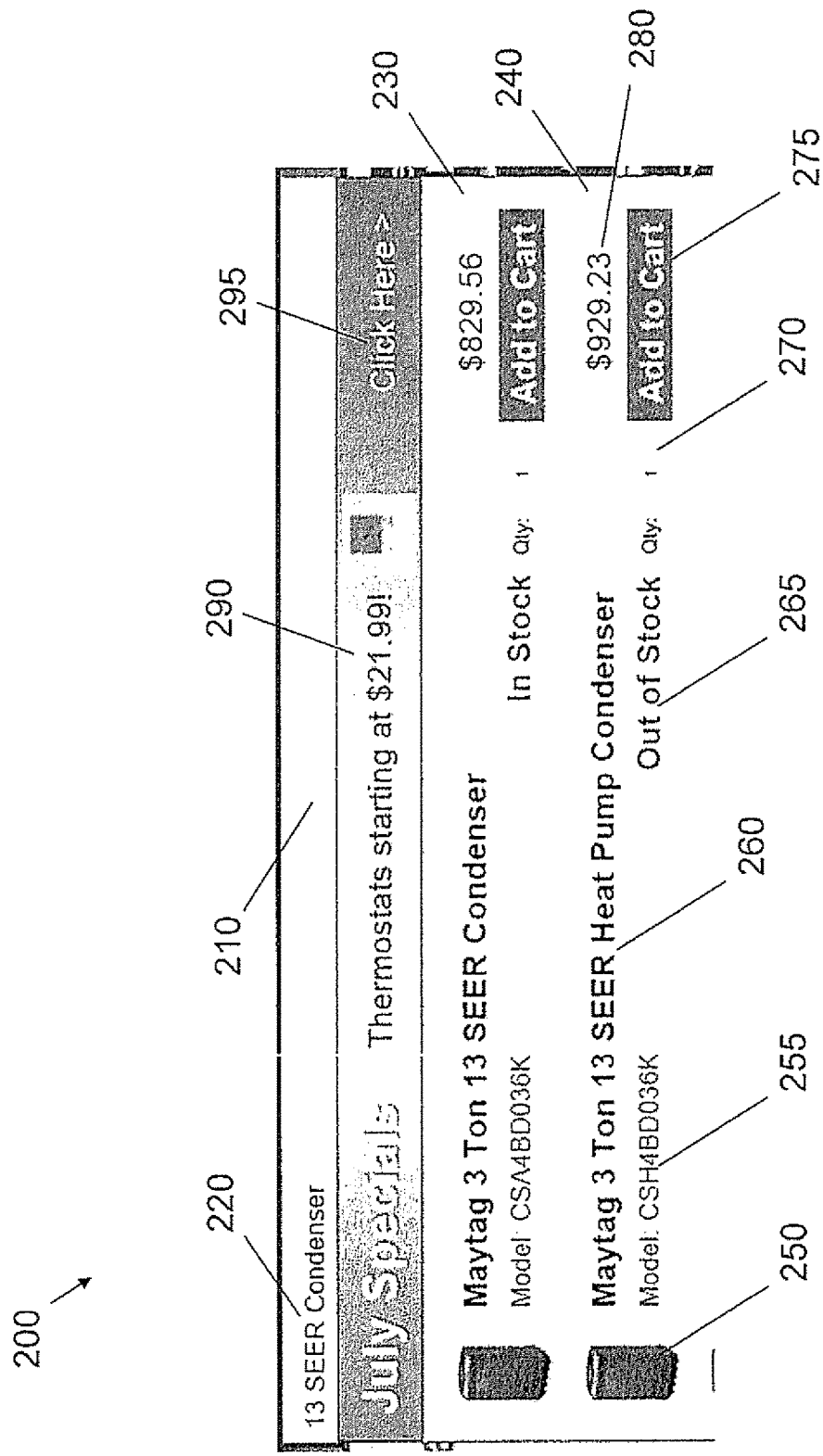
FIG. 2 is a screenshot of an example search results preview implementation according to an embodiment of the present invention.

FIG. 2 is a screenshot of an example search results preview 200 implementation (search-ahead) according to an embodiment of the present invention.

Search boxes, like search box 210, are used (for example, in e-commerce web sites, search engines, and other computer-based applications such as browsers on such platforms as personal computers, tablets, smartphones, etc.) to enter text (also called search strings), such as search string 220. Since the typing speed of users is generally a lot slower than the processing speed of the computer and the search engine, some search engines start processing the search request while the user is typing and return a list of suggested search strings (also called "type-ahead") as the user types that match the initial characters of the user's search string 220. This takes place in real time as the user types, the suggested search strings being pruned or reordered with each new character as it is entered. For example, the list of entries of matching products and descriptions changes with each character entered in the search box 210. The same or similar principles and programming techniques may be applied in different contexts to embodiments of the present invention by one of ordinary skill.

According to the embodiment of FIG. 2, shown in conjunction with an e-commerce site, the type-ahead function is enhanced by having example product or service matches of the search string 220 displayed as summaries 230 and 240 while the user enters the search string 220 (that is, a "search-ahead" function). These product or service summaries 230 and 240 are small enough to show numerous such summaries emanating from a single search-ahead input. The summaries are also large enough (e.g., detailed enough) so that meaningful decisions (such as whether to purchase or otherwise act on the product or service) can be made from the summaries 230 and 240. The summaries may be displayed as an extension (such as a downward extension) of the search box 210 overlaying the rest of the screen (see also, for example, FIG. 3). For example, the summaries may be displayed as a separate drop-down pane/menu from the search box 210.

It should be noted that, for illustrative purposes, only the first two summaries 230 and 240 are visible in FIG. 2, the other summaries appearing below these two. The total number of search-ahead summaries may vary with implementation (considering factors such as the size of each summary, the available screen space on the user's computer, etc.), as would be apparent to one of ordinary skill. For example, in some embodiments, the number of search-ahead summaries shown may be fixed, such as four, six, or 12. Thus, with the search-ahead feature, the user may view search results within the search box (for example, as an extension of the search box) without having to load the actual search page (as what happens when "enter" is selected during a normal search), allowing the user to preview and act on the particular search results without loading the search results page.

For example, each entry 230 or 240 may contain a thumbnail 250 (such as a photo) of the product or service (or just referred to as "product" for clarity of description), a model (or other identification) number 255, a product name or title 260 (such as a brand and model name, size, color, or other distinguishing information), an availability indicator 265 (such as In Stock or Out of Stock, or some other information about the product relevant to ordering or making a purchasing decision), a quantity box 270 (such as a box that can be selected and numbers (e.g., "1" or "2") entered to indicate a desired quantity), a selection box 275 (such as an Add to Cart button that adds the product and desired quantity to the electronic shopping cart (or just "shopping cart" for short) when selected, such as with a mouse button), and a price 280.

Such an arrangement, for example, may provide users with enough information to make informed decisions (such as whether to buy the product) from entering a few characters in the search box 210, and without ever having to leave the search box 210 (e.g., the "enter" key need never be hit when entering text in the search box, and the display screen or window is not replaced with a screenful of search results, as with a normal search). In some embodiments, the search box 210 and relevant summaries 230 and 240 remain displayed even if the user selects a particular quantity of a product and adds it to the shopping cart. In addition, the search result summaries 230 and 240 continue to be refined as more characters are added to the search box 210, or broadened as characters are removed from the search box 210. For example, techniques similar to existing type-ahead implementations combined with existing search engine interfaces may be used to implement the search-ahead function, as would be apparent to one of ordinary skill.

The particular arrangement of the search results preview entries 230 and 240 in FIG. 2 is just an example, and the summaries 230 and 240 may be different (e.g., different fields or arrangement of fields) in other embodiments, as would be apparent to one of ordinary skill. For example, other selection boxes 275 may be added when appropriate (for example, to decide size or color, such as when the size or color is otherwise not part of the name of the product), or other quantity boxes 270 (e.g., to enter another amount or code, such as with a numeric keypad, or to enter an alphabetic or other character input), or entire other fields (such as a brief description) may be added. The type of search results preview 200 may vary, for example, between different search boxes 210, such as between different e-commerce sites. For example, each e-commerce site may tailor the search-ahead summaries 230 and 240 to their particular line of business, such as providing those details important enough for that e-commerce site's customers to consider when deciding between products offered by that site.

The implementation of the search-ahead 200 feature may be similar to existing search engine interfaces as would be apparent to one of ordinary skill in the art. By way of example, while the user enters a search string 220 (such as with each character entered or deleted), the character or search string 220 is transferred to the search engine, which does a search on that string in the appropriate database (such as an e-commerce database having the products or services desired by the user). The database, for example, may be indexed by keyword, with keywords associated with various relevance measures, such that when numerous entries in the database contain keywords with the desired search string 220, the results can be sorted by relevance (using relevance criteria, such as how frequent the keyword shows up in the entry, how prominent the keyword is in the entry (such as is the keyword part of the product name), how many keywords match or have close proximity to each other in the entry, etc.), the order of the keywords in the search string versus in the entry, etc., as would be apparent to one of ordinary skill.

In other embodiments, the search-ahead preview 200 may be applied to general search engines (such as a search engine of the Internet), returning summaries of, for example, web pages that match the search string. For example, the thumbnail 250 may be a small rendition of the web page, the name 260 may be the name of the corresponding web page, the selection button 275 may take the user to the particular web page, etc. A similar embodiment may be employed for a web browser (such as an Internet browser), showing possible web page summaries based on the characters entered in the search box 210.

In summary, according to embodiments of the present invention, the type-ahead feature of a search box is replaced with a search-ahead feature, that returns summaries of the potential targets of the search (e.g., products, web pages), the summaries having sufficient size to display enough meaningful information for users to make an informed choice (e.g., to buy the product, to visit the web site, etc.) but also being small enough that numerous (e.g., four, six, or 12) such entries can fit on a sample display panel or window to present a choice to the user (when appropriate, such as when numerous candidate targets are found for the search).

Access More Search Results in Search Box

Figure 3:
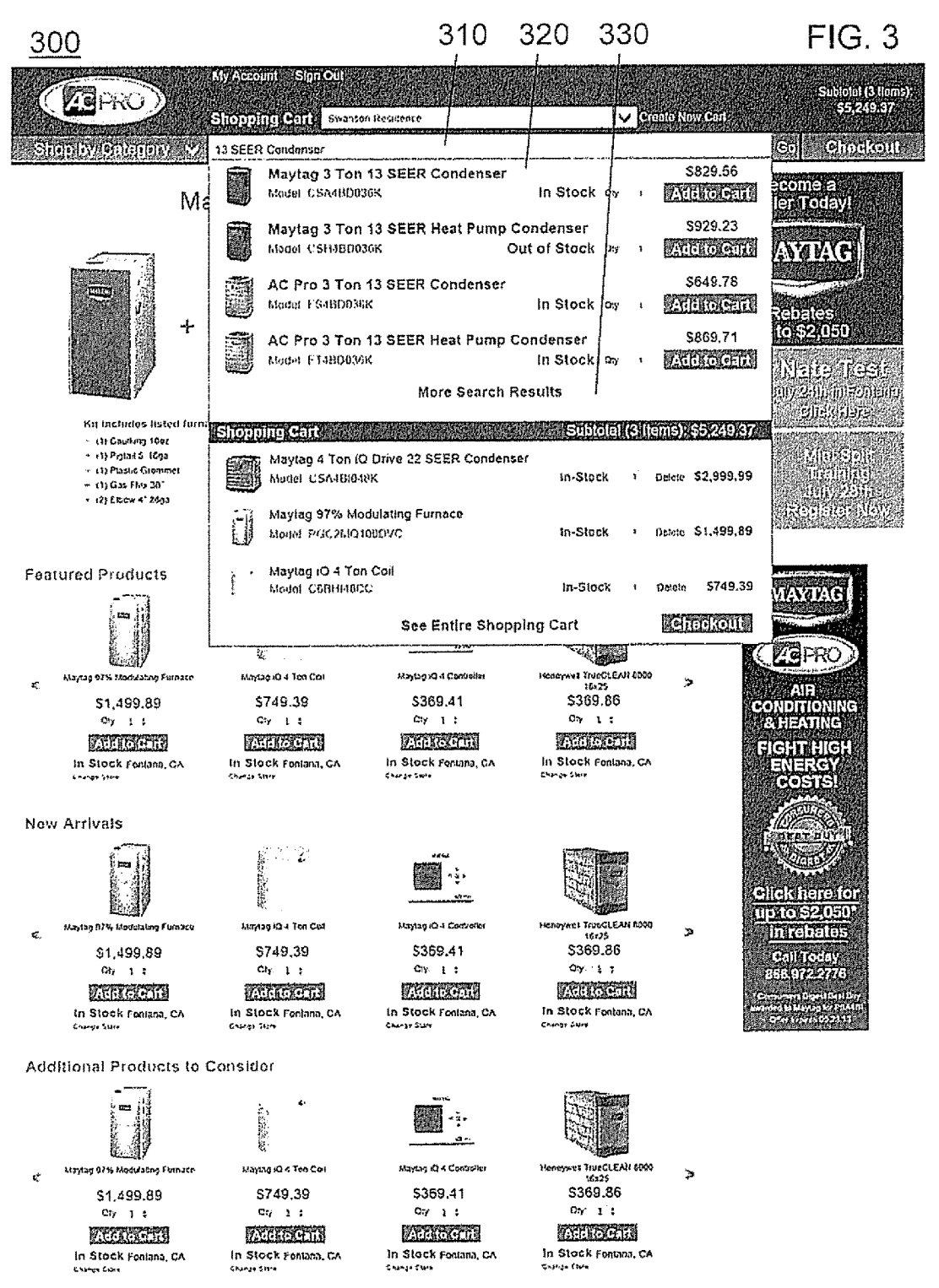
Figure 4:
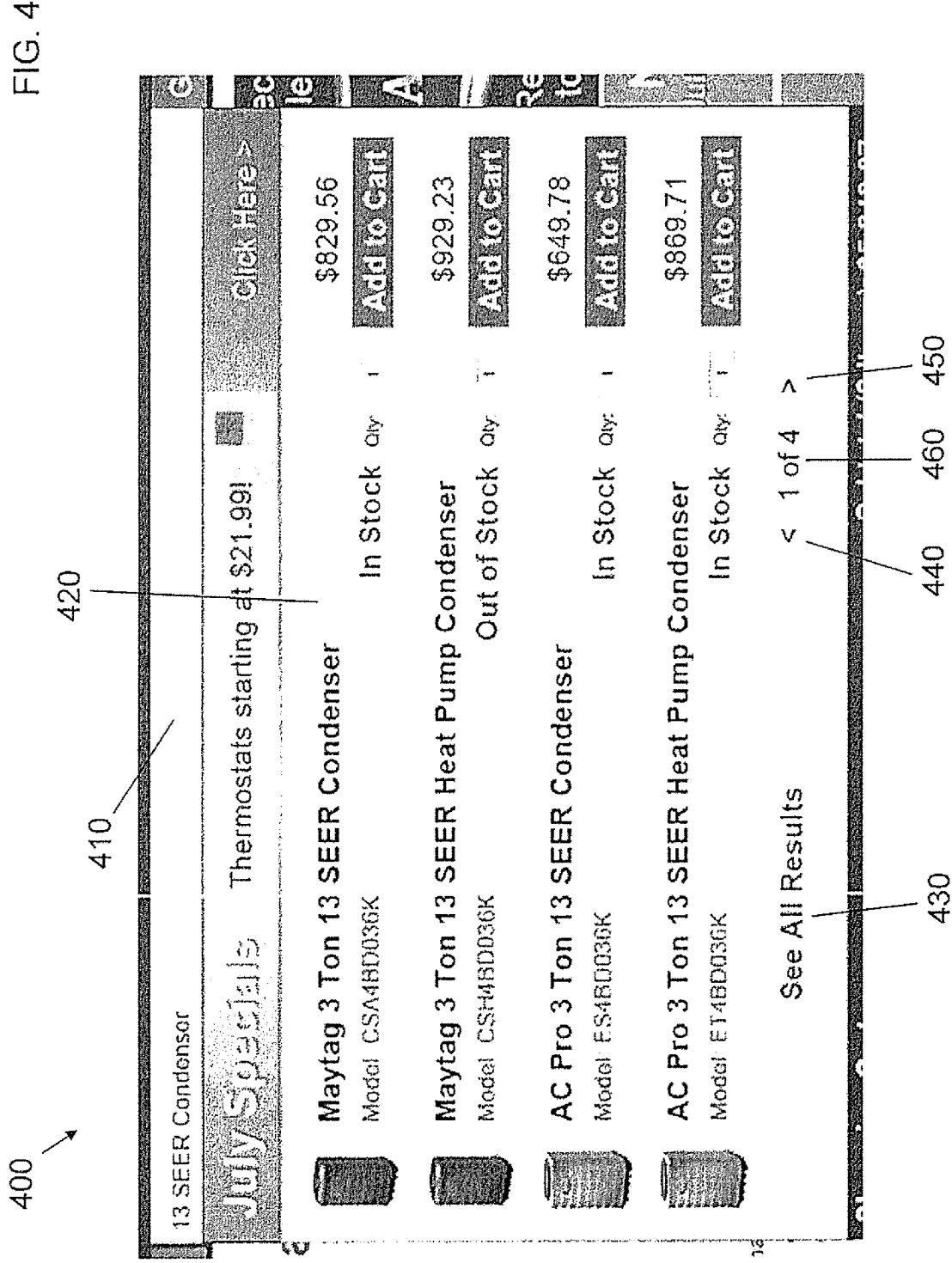
FIG. 4 is a screenshot of an example implementation of accessing more search results according to another embodiment of the present invention.

FIG. 3 is a screenshot of an example implementation 300 of accessing more search results according to an embodiment of the present invention. FIG. 4 is a screenshot of an example implementation 400 of accessing more search results according to another embodiment of the present invention.

Similar to the search results preview 200 in FIG. 2, the implementation 300 of FIG. 3 has a search box 310 and search-ahead summaries 320 (four, in this case), which are displayed as a separate pane overlaying the standard search results. However, while four search-ahead results are shown in FIG. 3, the user may want to access more. Accordingly, for situations such as when there are too many search results to show in a single search results preview portion 300 of the search box 310, a More Search Results 330 button is provided to display or access further search-ahead results (such as four more, or a screenful more, or the number of remaining matches, or some other number).

In a similar fashion, the implementation 400 of FIG. 4 has a search box 410 and search-ahead summaries 420 (four, as in FIG. 3), and a See All Results 430 button for displaying all of the search-ahead summaries (instead of, for example, only the four most relevant ones 420). Another way to access the other summaries is to scroll through groups of them, using the Backward 440 and Forward 450 scroll buttons. Selecting these buttons rewinds or advances the current group of summaries (in this case, four separate groups), as indicated in the group display 460 (e.g., "1 of 4" for displaying the first group of four total groups). Each group, for example, may hold four summaries, with group 1 being the most relevant, group 2 being the next most relevant, etc.

Clicking on the Backward 440 and Forward 450 buttons does not affect the display except to refresh the search results preview portion 420 of the search box 410. In some embodiments, the See All Results 430 button may load all the results in a scrollable search results preview portion of the search box 410.

Thus, the More Search Results 330 and See All Results 430 buttons allow the user to view or access more results within the search box 310 or 410 without having to load the actual search page. As with the search results preview 200 of FIG. 2, products can be added to the shopping cart from the search-ahead summaries 320 and 420 while still displaying the search-ahead summaries 320 and 420. In other embodiments, these features may be applied to other search boxes (not just those for e-commerce sites), such as for general search engines or Internet browsers, similar to that described above.

Mouse-Over Product Results (Description Preview)

Figure 5:
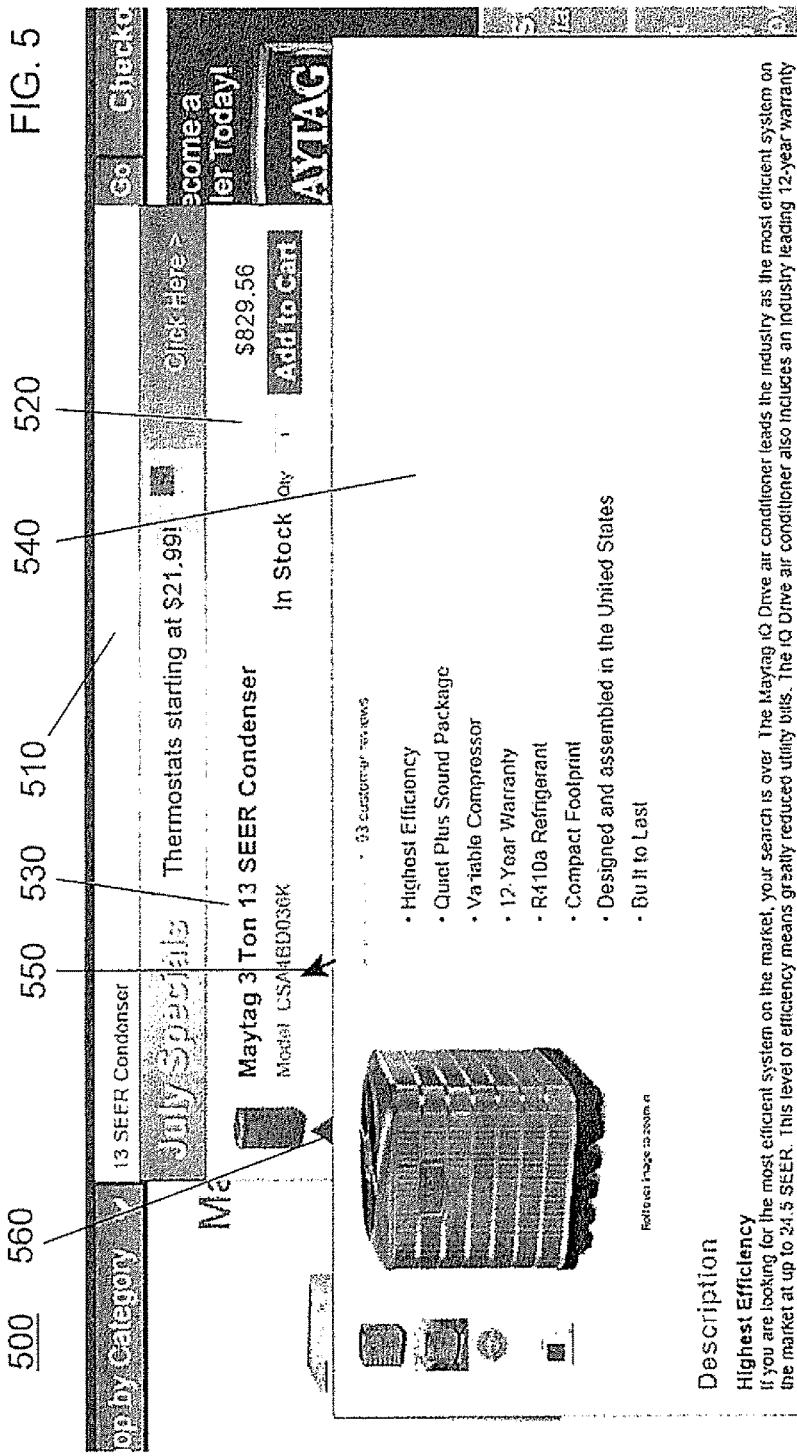
FIG. 5 is a screenshot of an example mouse-over product results implementation according to an embodiment of the present invention.
Figure 6:
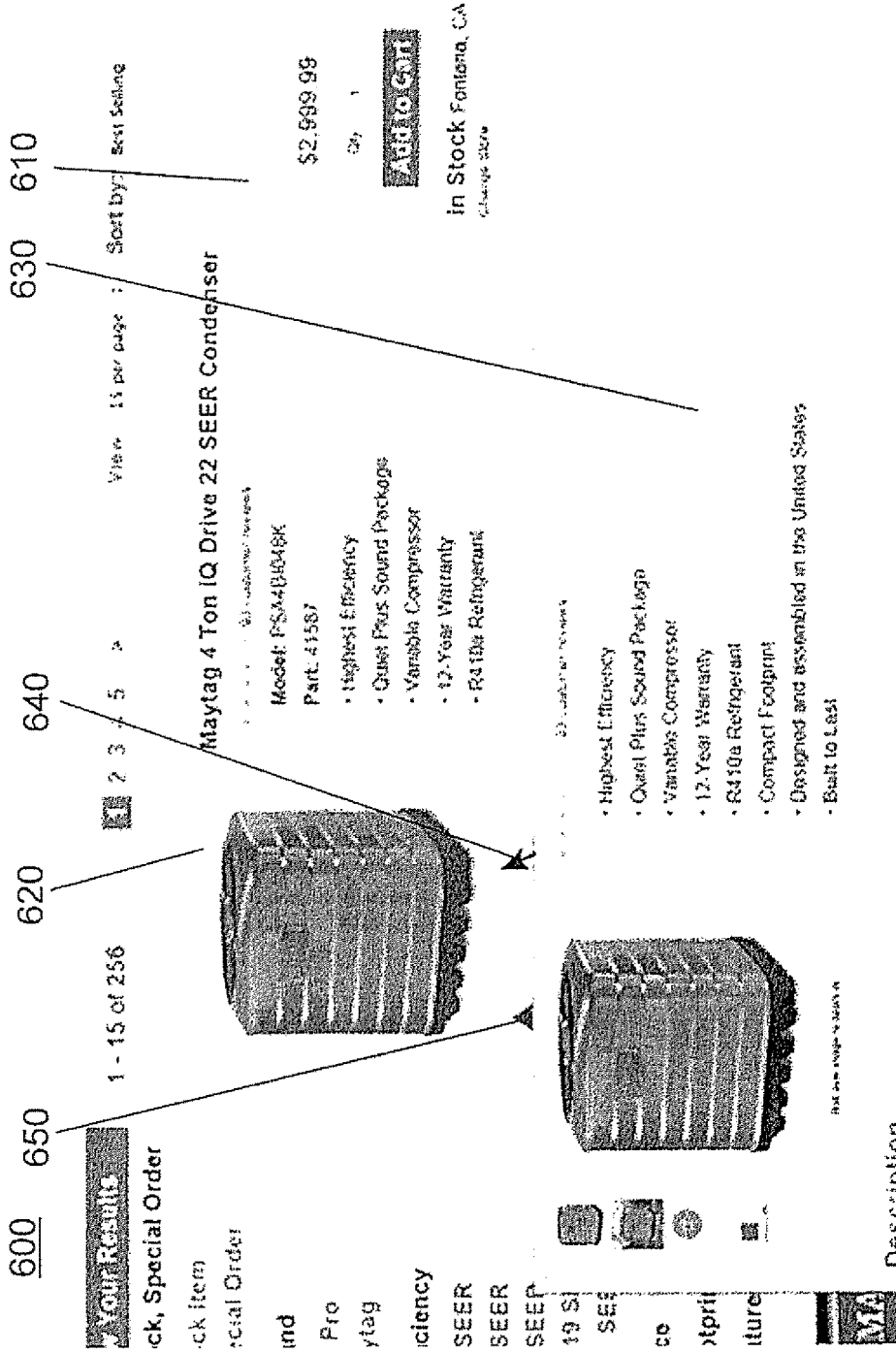
FIG. 6 is a screenshot of an example mouse-over product results implementation according to another embodiment of the present invention.

FIG. 5 is a screenshot of an example mouse-over product results 500 implementation according to an embodiment of the present invention. FIG. 6 is a screenshot of an example mouse-over product results 600 implementation according to another embodiment of the present invention.

Search results sacrifice much of the product description to produce a compact results list. In embodiments of the present invention, the user may use their mouse (or mouse pointer) to hover over a product to see more detail (such as when performing a mouse-over with the mouse pointer). Accordingly, in some embodiments, a trigger portion or mouse-over portion (such as the thumbnail or picture of the product, web page, etc.) activates the display of a more complete description of the product/web page/etc., that is brought up and overlays (a portion of) the screen until such time as the mouse is moved away (e.g., moved away from the trigger portion or overlaying description portion).

For example, the same or similar content of a product page or web page may be displayed over a portion of the screen (such as in a separate pane close to the trigger portion), without actually loading the product page or web page. This mouse-over product results (or description preview) allows a more complete description of any product (or more representative web page in case of a browser hit list, etc.) in the search results preview or search results list to be viewed without having to load the product or web page. For instance, when doing a mouse-over of a trigger portion of a search-ahead summary, the description preview may include the same or similar information to a normal search result entry. The trigger portion or mouse-over portion may be extended to include the description preview pane while the description preview is being displayed, allowing interaction between the description preview portion and the mouse pointer.

For example, in the embodiment of FIG. 5, the mouse-over product results screen 500 has a search box 510 and search-ahead summaries 520 (for example, as described in the above embodiments). A portion 530 (for example, a trigger portion) of each search-ahead summary 520 (such as the thumbnail, the name or title, and the model or brief description) is sensitive to mouse-over (i.e., hovering the mouse pointer 550 over the sensitive portion 530, as illustrated in pink in FIG. 5), causing a preview 540 (such as the corresponding product or web page, or a more thorough description, etc.) to appear as a separate pane. The preview pane 540 may incorporate a connection portion 560 (e.g., arrow, triangle, etc.) connecting the preview pane 540 to the associated summary 520 or trigger portion 530. The preview 540 may continue to display as long as the mouse pointer stays over the sensitive portion 530 (or, in other embodiments, over the sensitive portion 530 or over the preview 540); otherwise, the preview 540 disappears.

In FIG. 6, a similar mouse-over product results 600 is illustrated, only this time for normal search results 610 from a search engine (such as an e-commerce search engine), and not the search-ahead summaries 520 of FIG. 5. For example, the normal search results 610 may have entries that are significantly larger (e.g., containing longer descriptions) than the search-ahead summaries 520. Here, each search result 610 has a corresponding mouse-over portion 620 (as illustrated in pink in FIG. 6) that, when the mouse pointer 640 hovers over (as illustrated in FIG. 6), loads the preview 630 similar to (or more extensive than) the preview 540 in FIG. 5 with a connection portion 650 (triangle) connecting the preview pane 630 to the associated search result entry 610 or trigger portion 620. For instance, when doing a mouse-over of a trigger portion of a search result entry, the description preview may include the same or similar information to loading the product page or web page. The mouse-over portion 620 for the search result entry 610 may also be larger than the mouse-over portion 530 of the search-ahead summary 520, as illustrated in FIG. 6.

It should be noted that the description preview is applicable to more than just the search box search results preview area or an e-commerce web site search results. Description preview may also be used with a regular search engine results page. For example, in some embodiments, hovering over the search result entry (or a particular portion of the entry) causes the preview (such as the corresponding web page) to display, only like the product description preview above, no pages are actually loaded. Rather, only a preview (e.g., a reduced size version, or only a portion of the page, etc.) is shown while the mouse is hovering over the entry or preview area.

In one or more embodiments, when the product details or web page are longer or larger than what fits in the preview box, the user may be able to scroll down within the box to see the rest of the product or web page. In some embodiments, other content may be added to this preview, for example, videos. All of this takes place without actually loading the web page and displacing the current screen or window contents (such as what happens when clicking on an address or hitting enter in a search or address box).

Shopping Cart in Search Results (Shopping Cart Preview)

Figure 7:
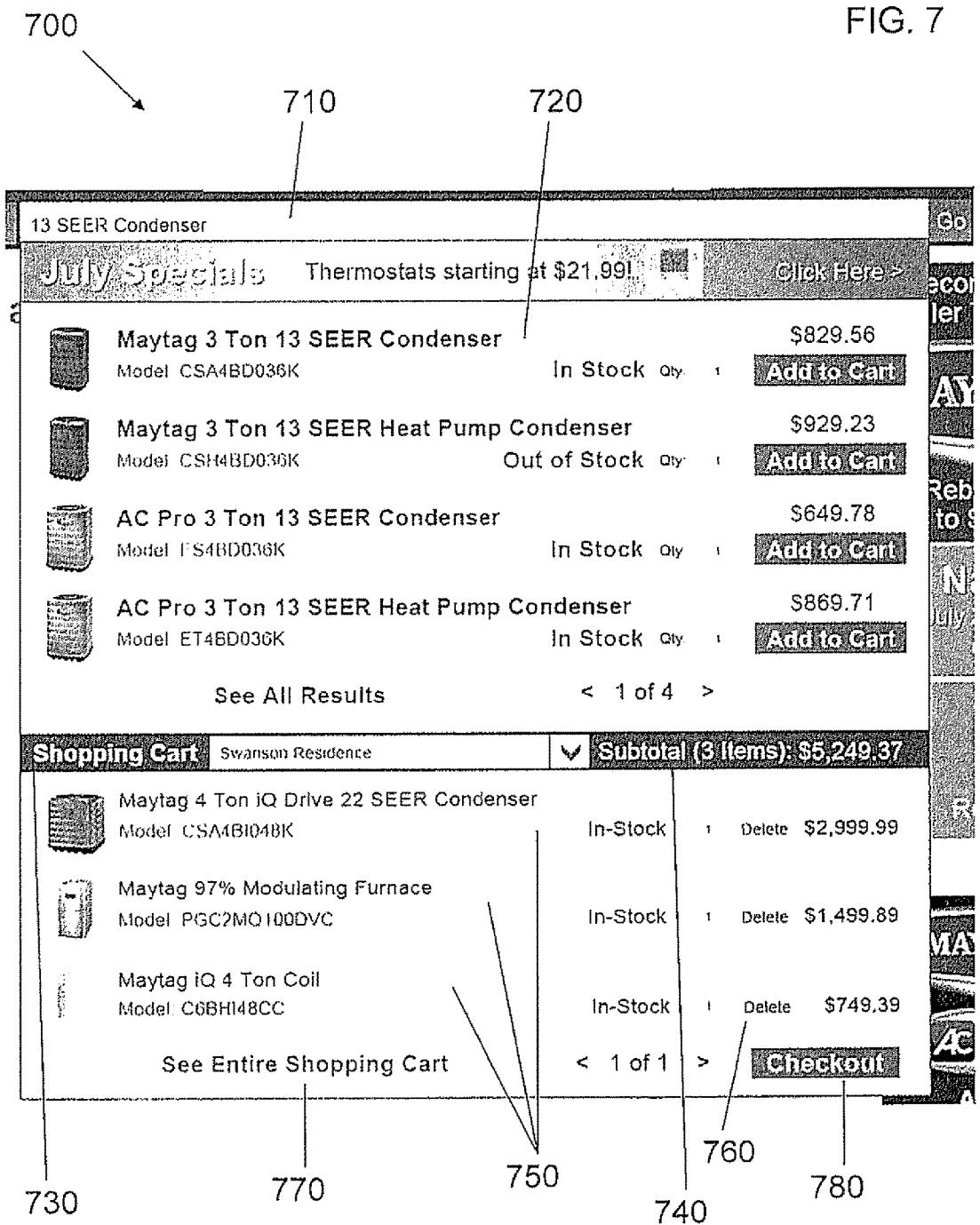
FIG. 7 is a screenshot of an example shopping cart in search results implementation according to an embodiment of the present invention.

FIG. 7 is a screenshot of an example shopping cart in search results 700 implementation according to an embodiment of the present invention.

Similar to FIGS. 2-6 above, the shopping cart in search results 700 in FIG. 7 has a search box 710 and search-ahead summaries 720. However, while the shopping cart is normally only visible as a separate page (such as when clicking "Proceed to Shopping Cart" or "Display Shopping Cart"), here, the shopping cart 730 (or a preview of the shopping cart) is visible at the bottom of the search box 710 (for example, below the search-ahead results 720). Thus, with this feature ("shopping cart preview"), the search box 710 is enhanced to include the shopping cart 730 (such as when the shopping cart has items in it, and the search box 710 is being used).

Similar to the techniques above, shopping cart preview 730 avoids separate page loads (such as to see the shopping cart) and instead displays the shopping cart information 730 in a usable form from the search box 710. By way of example, the shopping cart preview 730 may have a header, including a summary portion 740 (for instance, a subtotal (e.g., "$5,249.37") and items in cart count (e.g., "3 items"), as shown in FIG. 7). The shopping cart preview 730 may include the same or similar information as would be displayed if the actual shopping cart was being displayed, and may implemented in a similar manner as would be apparent to one of ordinary skill. The shopping cart preview 730 may also interact with the search-ahead summaries. For example, selecting "Add to Cart" in one of the search-ahead summaries adds the corresponding item to the shopping cart and updates the shopping cart preview 730 to reflect the additional item.

In FIG. 7, the shopping cart items show up as entries 750 (three, in this case). Each shopping cart entry 750 may be similar in appearance, and contain similar fields (such as a quantity box), to a search-ahead result 720. However, the present invention is not limited thereto, and in other embodiments, the shopping cart entries 750 may be customized to delete or include fields more relevant to the shopping cart portion of a particular e-commerce site or transaction. By way of example, the "Add to Cart" button may be removed from the search-ahead entry 720 and replaced with a "Delete" 760 (or "Remove from Cart") button. Selecting the Delete 760 button causes the corresponding item to be removed from the shopping cart and the corresponding entry 750 to be deleted from the shopping cart preview 730.

Similar to the implementation 400 of FIG. 4, the shopping cart preview 730 may also include a section 770 for displaying or accessing more cart contents (such as a "See Entire Shopping Cart" button, backward and forward group buttons (e.g., "<" and ">"), group display (e.g., "1 of 2"), etc.), including similar features, such as the ability to scroll through groups of items in the shopping cart. The section 770 may also include a "Checkout" 780 button, to take the user to the checkout portion of the e-commerce site. Similar to the above implementations, in some embodiments, the shopping cart preview 730 may only be visible as long as the search-ahead preview is being displayed. In other embodiments, the shopping cart preview may be visible at other times, such as when the search box 710 has been selected (e.g., when the search box 710 displays an active cursor for character input), even before any text has been inserted into the search box 710.

Thus, as the user enters characters into the search box 710, search result summaries 720 may show up in the search box 710 (search-ahead) along with a display of a (possibly empty) shopping cart preview 730. As the user adds items to the shopping cart (e.g., by clicking the Add to Cart button), the items appear as entries 750 in the shopping cart preview 730. From the shopping cart preview 730, the user may change quantities of or delete individual items, see if the items are in stock, etc. In some embodiments, other features, such as the mouse-over product descriptions (description preview), may also be available for the shopping cart items. That is, relevant features available to search-ahead summaries may also be made available to the shopping cart preview entries.

Multiple Shopping Carts

Figure 8:
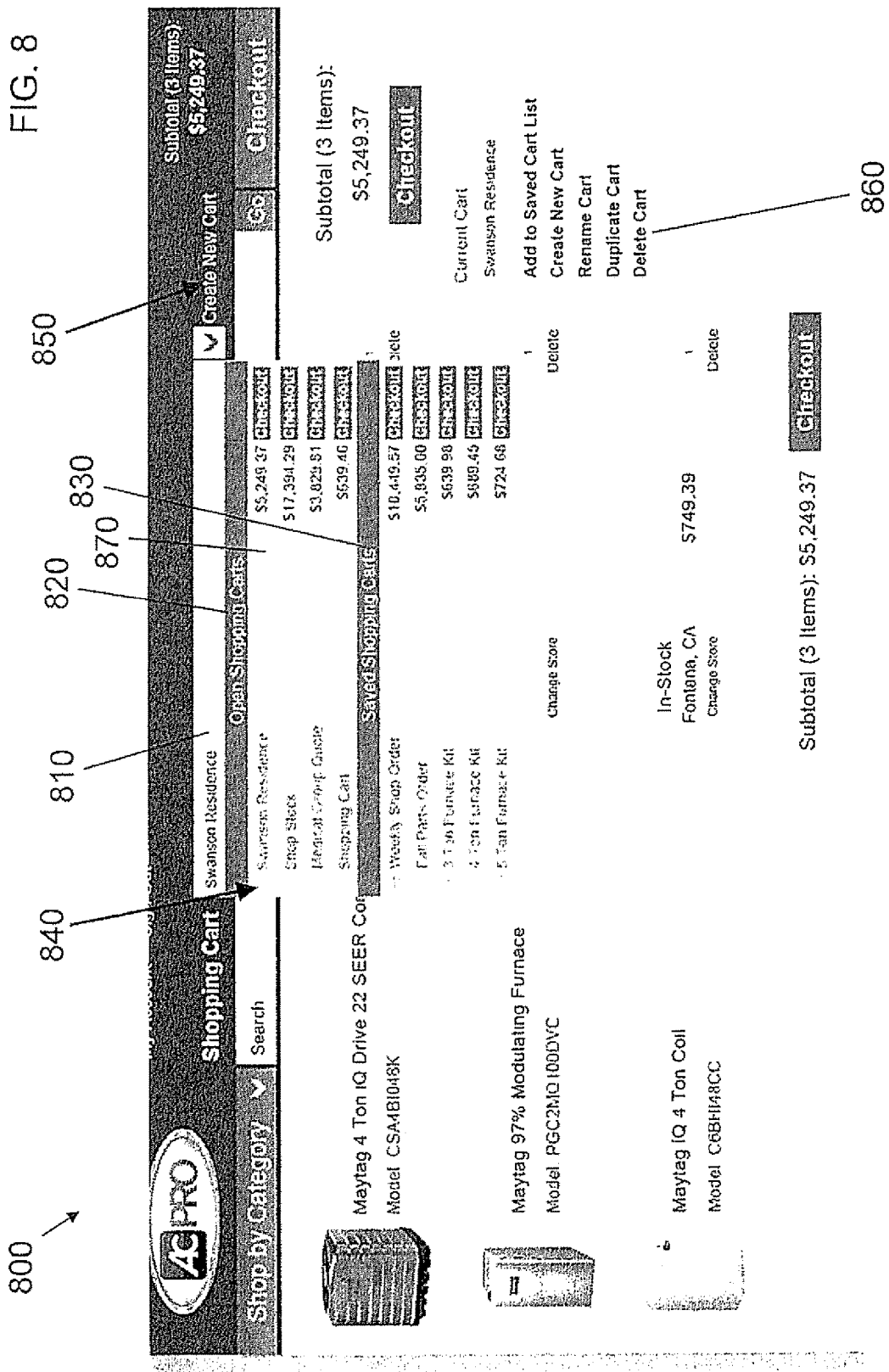
FIG. 8 is a screenshot of an example implementation of multiple shopping carts according to an embodiment of the present invention.
Figure 9:
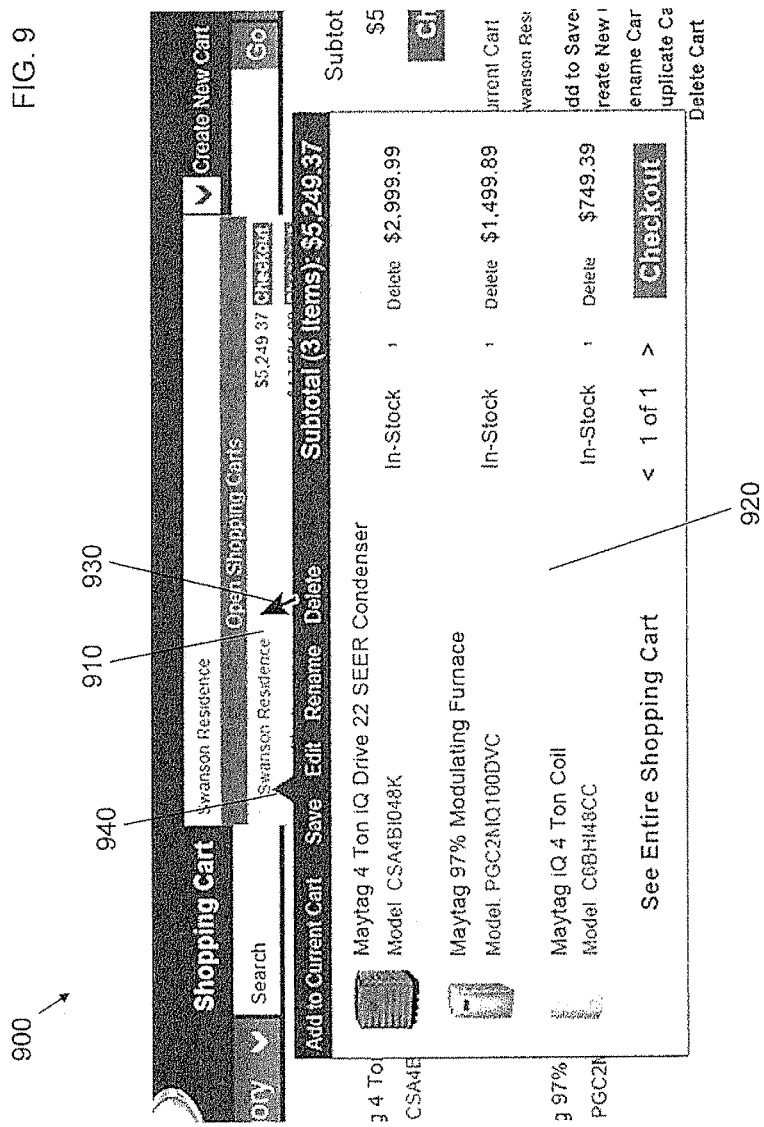
FIG. 9 is a screenshot of an example implementation of multiple shopping carts according to another embodiment of the present invention.

FIG. 8 is a screenshot of an example implementation 800 of multiple shopping carts according to an embodiment of the present invention. FIG. 9 is a screenshot of an example implementation 900 of multiple shopping carts according to another embodiment of the present invention.

Implementations 800 or 900 of multiple shopping carts may be used together or independently of the features disclosed above (such as search-ahead and shopping cart preview). For example, implementations 800 or 900 of multiple shopping carts may be used in place of a normal shopping cart page (that only processes one shopping cart at a time). With multiple shopping carts, as the name implies, a user may have more than one shopping cart in, for example, an e-commerce setting, with one of the shopping carts being identified specially (such as being identified separately at the top of a drop-down menu 810) as the current (or default) shopping cart (e.g., the shopping cart for which functions such as "Add to Cart" apply when no other shopping cart is identified). Each shopping cart may be identified by name, as in the implementation 800 of multiple shopping carts of FIG. 8, which shows nine separate shopping carts. The shopping carts appear as entries, such as shopping cart entry 870, with four shopping carts 820 that are currently open, and five shopping carts 830 that are saved in the example embodiment of FIG. 8.

Selecting any shopping cart from the groups 820 and 830 of shopping carts may open that shopping cart as the current shopping cart 810. Each entry in the drop down menu 820 and 830 may have a name, a current subtotal of the items (e.g., "$5,249.37") in the shopping cart, a Checkout button (to take the user straight to the Checkout processing for the particular shopping cart), and a grab area 840 (illustrated in FIG. 8 by three horizontal lines to the left of the shopping cart name in each shopping cart entry). The grab area 840 may be used to "grab" the shopping cart entry (for example, with a mouse pointer) and drag the shopping cart entry from one group of shopping carts to another (such as from the open shopping carts 820 to the saved shopping carts 830) or from one position of a group of shopping carts to another (for example, from the bottom of the saved shopping carts 830 to the top of the saved shopping carts 830).

Multiple open shopping carts 820 may be handy for situations such as contractors working with multiple customers and having to maintain a separate shopping cart for each customer (such as to bid on a contract for the customer). Multiple saved shopping carts 830 may be also useful for users who make a standard order numerous times with a particular e-commerce vendor. Shopping carts may be created, for example, through a "Create New Cart" 850 button, or by selecting a function from a list 860 of shopping cart functions (including, for example, "Add to Saved Cart List," "Create New Cart," "Rename Cart," "Duplicate Cart," and "Delete Cart"). FIG. 8 also illustrates numerous possible locations of the current shopping cart's Subtotal and Checkout buttons, but the present invention is not limited thereto. In other embodiments, there may be different numbers of or locations of the current shopping cart's aspects or functions.

For example, with implementations 800 or 900 of multiple shopping carts, the shopping carts may be named or otherwise identified, and selectable from usual electronic selection techniques (e.g., drop-down menu, clickable individual number or name, arrow buttons, etc.) Shopping carts may be created, saved, named or renamed, duplicated, deleted, etc., all as part of the same access to an e-commerce site.

Further, as already mentioned, multiple shopping carts may be combined with other features, such as shopping cart preview. Such a combination may allow any of the shopping carts to be viewable or otherwise accessible from the search box. See, for example, the implementation 300 of accessing more search results in FIG. 3 or the shopping cart preview 700 in FIG. 7, each of which also features a drop-down menu from which a current shopping cart may be selected and displayed with the search-ahead portions of the display. In FIG. 3, for example, the multiple shopping cart interface is right above the search box 310, while in FIG. 7, the multiple shopping cart interface 730 is located right below the search-ahead results 720 (which may allow switching of shopping carts while entering text in the search box 710). In other embodiments, as already mentioned, multiple shopping carts may be used as a standalone feature applicable to, for example, any e-commerce site that uses shopping carts.

Other combinations of the above features are also possible. For example, multiple shopping cart preview 900 is illustrated in FIG. 9. Here, when a mouse pointer 930 hovers over a trigger portion (such as the name portion 910, illustrated in pink in FIG. 9) of a shopping cart entry in a multiple shopping cart drop-down menu, the corresponding shopping cart preview 920 is brought up and overlays a portion of the screen. The shopping cart preview 920 may have an interface with features as described above, including connection portion 940 (e.g., a triangle) connecting the shopping cart preview 920 to the associated name portion 910, See Entire Shopping Cart button, group buttons (for navigating among groups of items in the shopping cart), a group number display (such as "1 of 4"), a Checkout button, along with function buttons (such as Add to Current Cart, Save, Edit, Rename, and Delete). The shopping cart preview 920 may stay active as long as the mouse is hovering over the mouse-over portion of the shopping cart entry or the shopping cart preview 920 portion.

Multiple shopping carts may let a user have multiple separate shopping carts and switch in real time between them. For example, a user could be building one shopping cart, then create a new shopping cart, add products to it, and then switch back to the first shopping cart or to another shopping cart. When the user selects a shopping cart, all of the relevant displayed fields (such as cart quantity and subtotal) are updated to reflect the current shopping cart. The shopping carts may be renamed, for example, to be more mnemonic or user friendly. Open shopping carts may be used for all shopping carts that are currently open that the user has not yet saved. However, in some embodiments, even if the user leaves a particular website (such as an e-commerce website) and later comes back, the open shopping carts are still there. Multiple shopping carts may be implemented using techniques similar to those of single shopping carts, with additional logic for features such as switching between the carts, naming or renaming the carts, etc., as would be apparent to one of ordinary skill.

According to one embodiment, once the Checkout option is selected for a particular shopping cart, the shopping cart disappears unless the user further chooses to make this shopping cart part of the saved shopping carts section. The three horizontal lines 840 in front of the name of each shopping cart may allow the user to grab that shopping cart with their mouse and either change the order in the drop-down menu or drag the shopping cart to, for example, the saved carts area 830.

Advertisement within a Search Box

Search box advertising is another feature combinable with some of the above features, such as search-ahead. Referring back to FIG. 2, with search box advertising, in an example embodiment, an advertisement 290 appears in the search box 210 (such as at a prominent location, like right below the area for inserting search string text). For example, the search box advertisement 290 may appear like or similar to a regular entry in the search-ahead results, such as at the top of the list. The advertisement 290 may be for anything (such as a product relevant to a particular e-commerce web site associated with the search box 210). In some embodiments, the advertisement 290 may be tied to the search string and subject to search-ahead (e.g., change dynamically as the search string is entered into the search box 210), etc.

The advertisement 290 may have buttons (such as a "Click Here" 295 button), etc., to take the user to a different page, as in normal banner advertisements. The advertisement 290 may appear as part of the search-ahead of a regular Internet search engine or browser address field entry in addition to an e-commerce web site search. The advertisement 290 may also appear as part of a browser search-ahead (such as with a URL entry box). Other example search box advertisements are illustrated in FIGS. 4-5 and 7. For example, the advertisement 290 may be tied to a particular search string or subset of a search string and appear at the top of the search-ahead results similar to a sponsored advertisement or search result appears in a normal search engine. The advertisement 290 may also be implemented in a similar fashion to that of existing sponsored search results, as would be apparent to one of ordinary skill.

Figure 10:
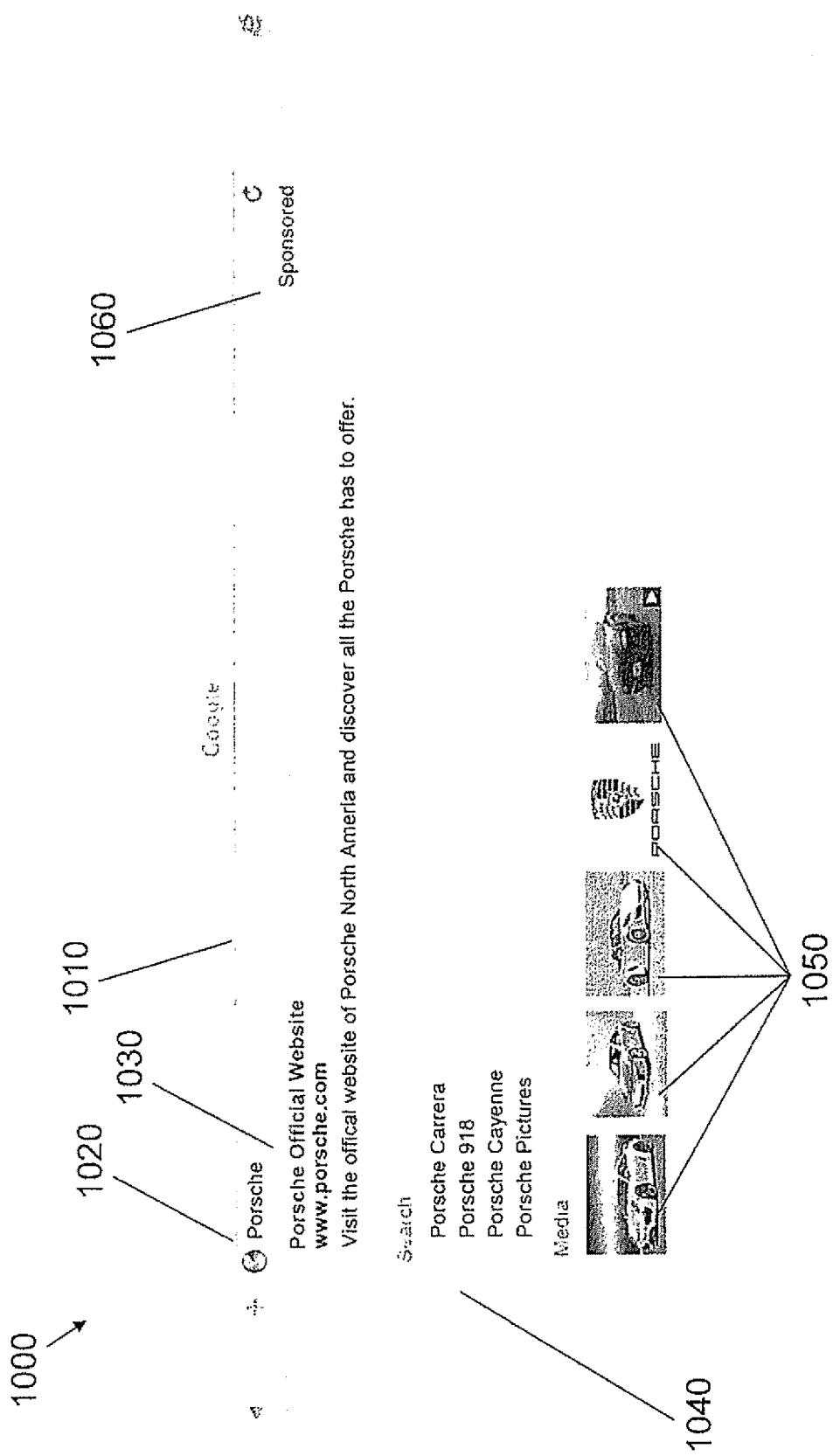
FIG. 10 is a screenshot of an example search box advertisement implementation according to an embodiment of the present invention.

FIG. 10 is a screenshot of an example search box advertisement implementation 1000 according to an embodiment of the present invention.

In the search box advertisement 1000 of FIG. 10, an Internet search box 1010 is shown. In the search box 1010, a search string 1020 has been entered, in this case "Porsche." As the string 1020 is typed in, a sponsored advertisement 1030 (such as an advertisement 1030 related to the search string 1010) appears below the search string 1020. Additional related search result type advertisements 1040 may also be displayed below the search string 1020, such as sponsored type-ahead entries related to the advertisement 1030. Further sponsored links, like media files (e.g., pictures, videos) 1050 related to the advertisement 1030, may also appear below the search string 1020. Clicking on any of these links, for example, may take the user to the particular site, file, or list of other resources related to the particular link that is clicked.

As the name implies, search box advertisement is an advertisement within (or attached to) the search box. The advertisement may be, for example, an image, text, video, or a combination of these. The search box may be for an e-commerce site, a search engine (such as for the Internet), a browser (such as an Internet browser or URL box), or other network application. For example, the advertisement may be relevant to the content of an e-commerce web site, but the search box advertisement may be used for non-e-commerce searches as well. The advertisement may be generic (such as not changed based on the search string) or may be targeted to what the user is searching for and may change as the user is typing or otherwise entering characters in the search box.

The search box advertisement may be used for predictive advertising. For example, the user may type "new lapt" and the search box will start displaying an advertisement for a laptop company, as the search engine knows the user is probably going to type "new laptop." The advertisement is not limited to something that looks like an advertisement. In some embodiments, the advertisement may be a product result that is featured. For example, a user may be searching for a laptop, and a supplier (say, for example, Dell) may pay to have their product show up first on the list of products within the search box advertisement or search string preview results, in a manner similar to normal Internet search engines, which often sell special search results spots (sponsored search results) for displaying similar products to those matching particular search strings. For example, the advertisement may appear with a sponsored advertisement 1060 identification. This feature may also be used, for example, in the Internet browser search or URL box.

In the example in FIG. 10, a user has typed Porsche into the Internet search box 1010 and is presented with the content shown. In other embodiments, the search box may be a URL box or a search box in a web browser (although this may also be done in a search box on a web page). The user may be presented, for example, with an advertisement or multiple advertisements, type-ahead results, image results, and videos that the user can click on (for example, with a mouse pointer). For example, any Internet browser or search box on a web page may be used. In some search box advertisement embodiments, when the user hits enter, the first search result (in this case, the Porsche Carrera) is selected.

Figure 11:
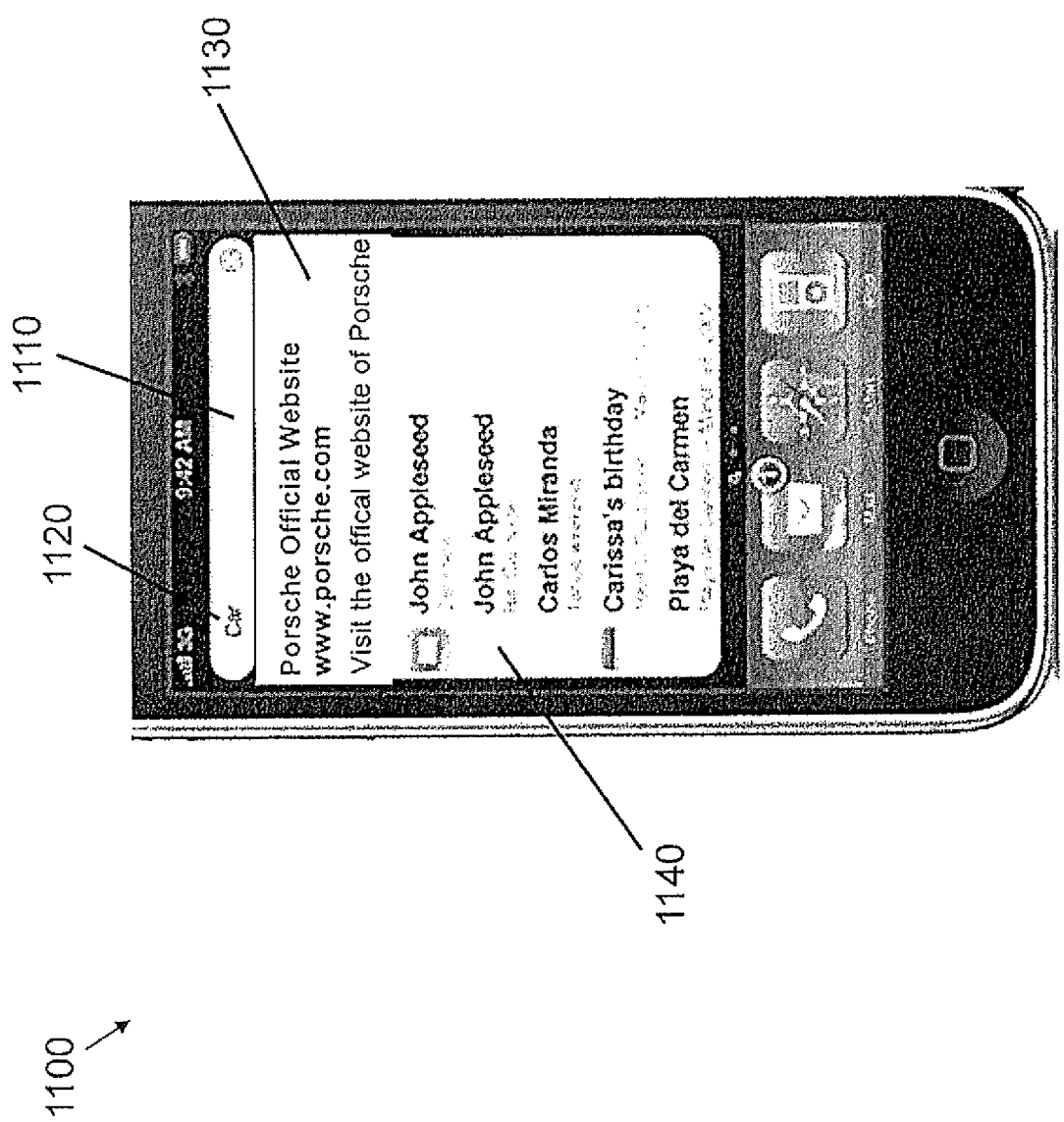
FIG. 11 is a screenshot of an example search box advertisement implementation according to an another embodiment of the present invention.

FIG. 11 is a screenshot of an example search box advertisement implementation 1100 according to an another embodiment of the present invention.

In the search box advertisement 1100 of FIG. 11, a smartphone (such as an iPhone) application ("app") search box 1110 is shown. In the search box 1110, a search string 1120 has been entered, in this case "Car." As the string 1120 is typed in, a sponsored advertisement 1130 (such as an advertisement 1130 related to the search string 1110) appears below the search string 1120. Clicking on this link, for example, may take the user to the particular site related to the link that is clicked. Normal search results 1140 related to the search (e.g., for the particular smartphone app) may appear below the advertisement 1130. The advertisement may be generic (such as not changed based on the search string) or may be targeted to what the user is searching for and may change as the user is typing or otherwise entering characters in the search box. For example, the advertisement may be relevant to the content of the search results, or the particular smartphone app whose search box is being used. In the example in FIG. 11, a user has typed Car into the smartphone app search box 1110 and is presented with the content shown.

Previously Purchased

Figure 12:
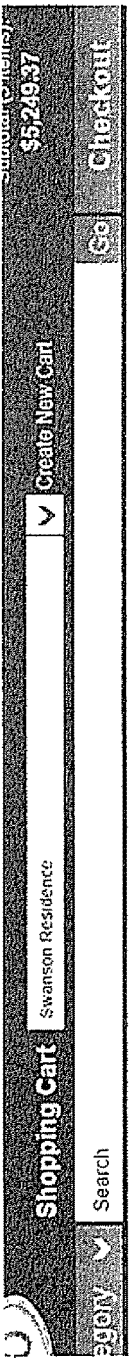
FIG. 12 is a screenshot of an example implementation of previously purchased products according to an embodiment of the present invention.

FIG. 12 is a screenshot of an example implementation 1200 of previously purchased products according to an embodiment of the present invention.

The implementation 1200 of previously purchased products allows previously purchased products (or previously visited sites, etc.) to be specially identified and appear higher in the search results. For example, this may be useful for customers doing repeat business or otherwise desiring to know what they have already purchased, as well as for users of browsers or search engines to recall previously visited sites, products, services, etc. This previously purchased products feature may be combined with other features above, such as search-ahead, mouse-over product results (description preview), or may be used with general search engines, browsers, etc., and adjusts the order of the search results to first display products the customer has already purchased (or web sites already visited, etc.).

The rationale with the previously purchased feature is that the user may be interested in a particular product already obtained, but the search string may not provide sufficient context to bring the product to the top of the list of search results (or at least to the first screen or group of search results). The user may then have to wade through screenfuls of candidate products, possibly selecting a similar but different (and unintended) product or web site in the process. In place of this manual distinguishing, the previously purchased product appears, for example, at the top of the list.

For example, in the implementation 1200 of previously purchased products of FIG. 12, 256 search results match the target string, but since the user has already purchased one of them before, this particular product shows up at the top of the search results with a special identifier 1210 ("Previously Purchased"). It should be noted that the product may still have to be eligible to be displayed, such as in the existing search-ahead results. That is, in one or more embodiments, the previously purchased products feature does not necessarily bring up any previously purchased product, just those matching the current search string. For situations where the previously purchased product is not desired (such as when trying to find a different product, but with a similar enough description that it matches a previously purchased product), a "Remove" 1220 button may be provided to, for example, remove such entries or otherwise prevent them from appearing at the top of the search results list.

This feature may be extended to general searching or browsing, such as Internet searching or browsing (e.g., general search engines, browser URL boxes, etc.), presenting sites already visited that match the desired search-ahead first in the list of search-ahead results. As discussed above, undesired products or sites may be deleted from the top of the list placement through the Remove button (such as for one-time visits or purchases, e.g., accidental or unintended visits).

According to some embodiments, the previously purchased products feature may be designed to put previously purchased products on the top of a search results page. For example, if a user buys a 3"×4" pack of yellow sticky notes, then on a future search for the same item, the user may have had to search through a few screenfuls of products to find the exact one they wanted (that is, that they purchased before). With the previously purchased products feature, the product may be added to the user's purchase history, so that the next time that the user searches for sticky notes, the 3"×4" pack of yellow sticky notes may be featured at the top of the search results list.

In embodiments of the previously purchased products feature, there may be a "Previously Purchased" (or other appropriate identifier) by the product so that the user searching for the product will know they purchased this product before. There may also be a "Remove" link (e.g., under the Previously Purchased identifier) to remove the product from the preferred listing position, so that if the user doing the search does not want this particular product to keep appearing at the top of the searches when they search for those specific keywords, they may do so by clicking the Remove button. For example, if a user buys a particular T-shirt, they may not be interesting in purchasing the same T-shirt again. Accordingly, hitting the Remove button allows the user to remove the previously purchased T-shirt from the list or otherwise prevent the T-shirt from always appearing at the top of the search results (the same T-shirt may, however, appear in its normal position in the search results if it sufficiently matches the search string).

Figure 13:
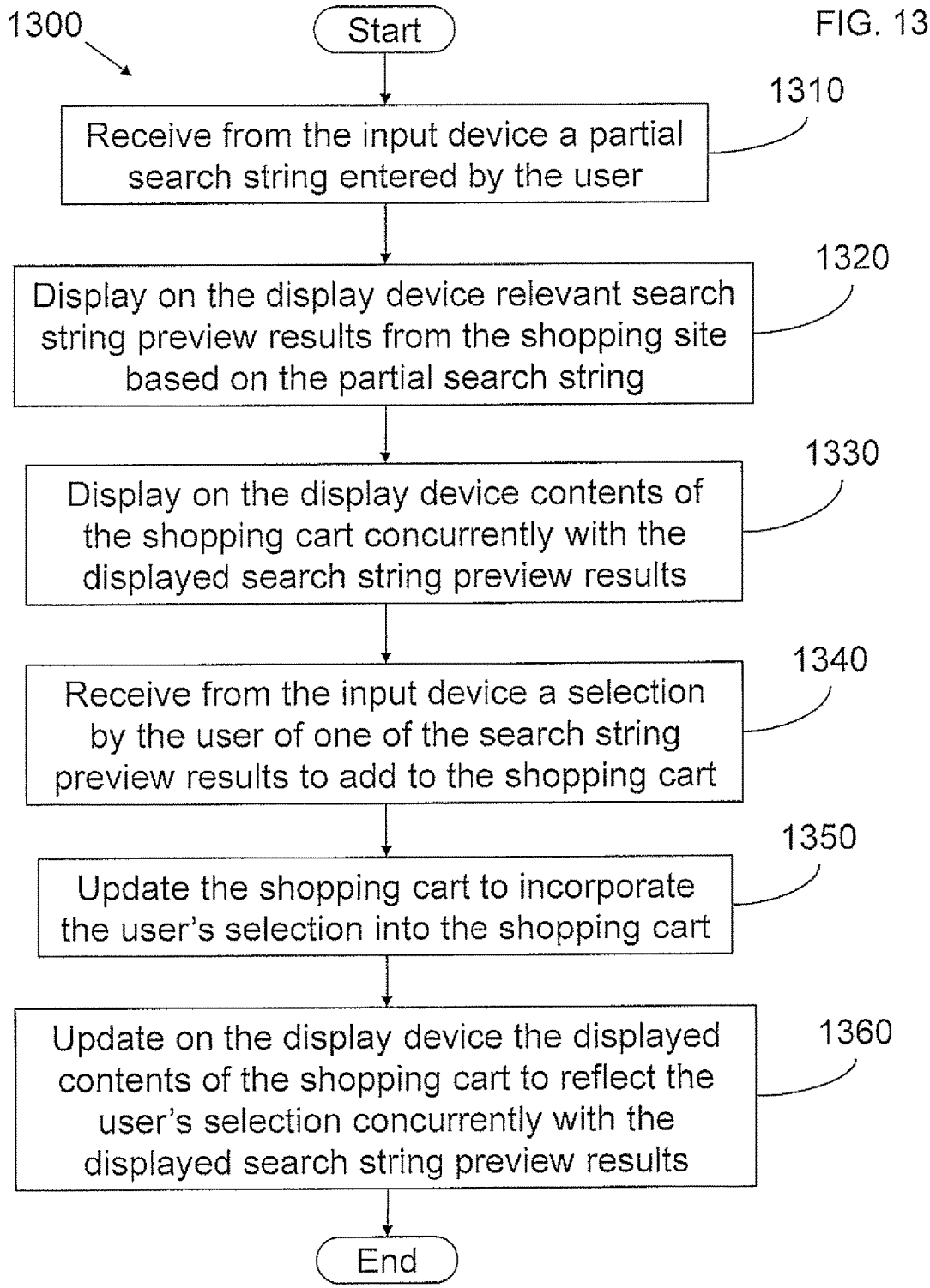
FIG. 13 is a flowchart of an example method for displaying contents of a shopping cart in a search results preview according to an embodiment of the present invention.

FIG. 13 is a flowchart of an example method 1300 for displaying contents of a shopping cart in a search results preview according to an embodiment of the present invention. This and other described methods in the present application may be performed, for example, by a computer processor executing computer instructions that perform the described methods, as would be apparent to one of ordinary skill. Further, in this and other described methods of the present invention, the appearance or ordering of the steps is not necessarily limited to that which is described, and in other embodiments, the appearance or ordering of the steps may be altered to achieve the same or similar result, as would be apparent to one of ordinary skill.

The method 1300 of electronic shopping with an electronic shopping cart may be implemented, for example, on a system including a computer processor, a network interface configured to connect the processor to an electronic shopping site and to shop at the shopping site using the electronic shopping cart, an input device configured to receive search string input from a user, and a display device configured to display search string preview results to the user as the user enters the search string input in the input device. Processing begins, and in step 1310, the user enters a partial search string (such as in a search box of an e-commerce web site) using the input device, and the entered partial search string is received by the processor. In step 1320, relevant search string preview results from the shopping site based on the partial search string are displayed on the display device (for example, as shown in the above embodiments). In addition, in step 1330, contents of the shopping cart are displayed on the display device concurrently with the displayed search string preview results (for example, as discussed and shown in the above shopping cart preview embodiments).

In step 1340, the user enters a selection of one of the search string preview results to add to the shopping cart. In step 1350, the shopping cart is updated to incorporate the user's selection. In step 1360, the displayed contents of the shopping cart are updated to reflect the user's selection concurrently with the displayed search string preview results.

Figure 14:
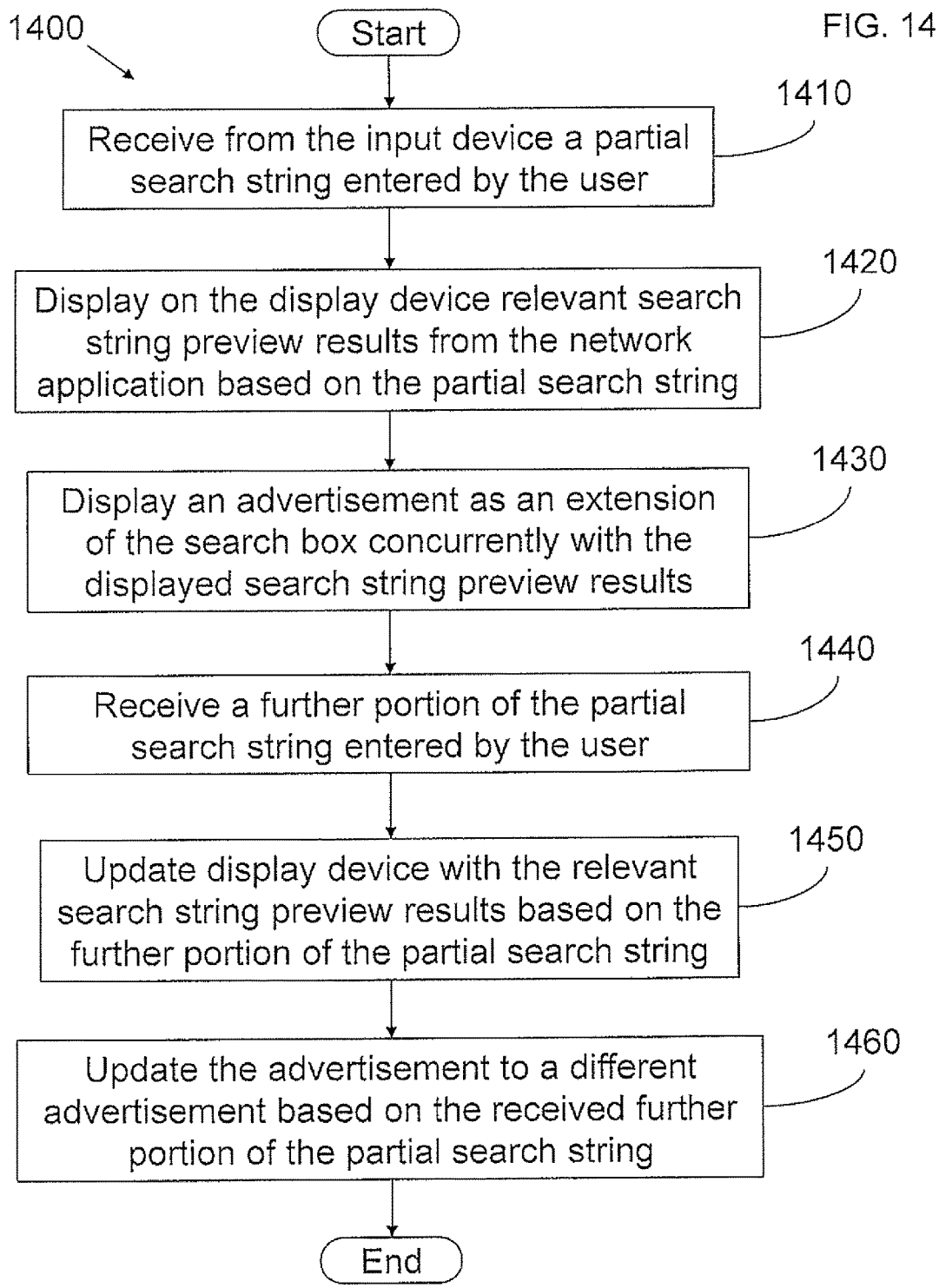
FIG. 14 is a flowchart of an example method for advertising within a search box according to an embodiment of the present invention.

FIG. 14 is a flowchart of an example method 1400 for advertising within a search box according to an embodiment of the present invention.

The method 1400 of electronic searching and advertising may be implemented, for example, on a system including a computer processor, a network interface configured to connect the processor to a search box of a network application, an input device configured to receive search string input from a user, and a display device configured to display search string preview results of the network application to the user as the user enters the search string input in the input device. Processing begins, and in step 1410, the user enters a partial search string (such as in an Internet browser or a search box of a network search engine) using the input device, and the entered partial search string is received by the processor. In step 1420, the processor displays on the display device relevant search string preview results from the network application based on the partial search string. In step 1430, the processor displays on the display device an advertisement as an extension of the search box concurrently with the displayed search string preview results.

In step 1440, the user enters a further portion of the partial search string using the input device, and the entered further portion of the partial search string is received by the processor. In step 1450, the processor updates the display device with the relevant search string preview results from the network application based on the received further portion of the partial search string. In step 1460, the processor updates on the display device the advertisement to a different advertisement based on the received further portion of the partial search string.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system of electronic shopping with an electronic shopping cart, comprising:
    a computer processor;
    a network interface configured to:
        connect the processor to an electronic shopping site and to a search box of the shopping site; and
        shop and select items for purchase at the shopping site using the electronic shopping cart, the shopping cart comprising the selected items for purchase from the shopping site;
    an input device configured to receive a search string from a user through the search box of the shopping site;
    a display device configured to:
        display the search box of the shopping site and search string preview results of the shopping site as a first extension of the search box to the user as the user enters the search string in the input device; and
        display contents of the shopping cart as a second extension of the search box concurrently with the search string preview results; and
    a non-transitory physical medium, wherein the medium has instructions stored thereon that, when executed by the processor, causes the processor to:
        receive from the input device a first partial search string entered by the user in the search box;
        process the first partial search string concurrently with the entering of the search string by the user in the search box, comprising:
            identifying first search results from the shopping site relevant to the first partial search string;
            selecting a first number of the relevant first search results; and
            selecting two or more fields including a name, title, or description of each of the first number of the selected relevant first search results to display in corresponding relevant first said search string preview results for display on the display device, the two or more fields representing a summary of a corresponding one of the search results from the shopping site;
        manipulate the display device to overlay the first number of the selected relevant first search string preview results above or below, and contiguous to, the search box, the first search string preview results being consistently sized and arranged presentations of their corresponding two or more fields; and
        manipulate the display device to further overlay first contents of the shopping cart concurrently with, above or below, and contiguous to, the first search string preview results or the search box, the first contents of the shopping cart comprising consistently sized and arranged presentations of corresponding first said selected items for purchase from the shopping site.

2. The system of claim 1, wherein the instructions, when executed by the processor, further cause the processor to:
    receive from the input device a selection by the user of one of the first search string preview results to add to the shopping cart for purchase from the shopping site; and
    process the selection by the user concurrently with displaying the search box and the first search string preview results on the display device, comprising:
        adding the user's selection to the first selected items to produce second selected items; and
        manipulating the display device to overlay the first contents of the shopping cart with second contents of the shopping cart concurrently with the first search string preview results, the second contents of the shopping cart comprising consistently sized and arranged presentations of corresponding said second selected items for purchase from the shopping site.

3. The system of claim 1, wherein the instructions, when executed by the processor, further cause the processor to:
receive from the input device a further portion of the search string entered by the user in the search box, the further portion of the search string combining with the first partial search string to form a second partial search string; and
process the second partial search string concurrently with the entering of the search string by the user in the search box, comprising:
identifying second search results from the network application relevant to the second partial search string;
selecting the first number of the relevant second search results;
selecting the two or more fields of each of the first number of selected relevant second search results to display in corresponding relevant second said search string preview results for display on the display device; and
manipulating the display device to overlay the first search string preview results with the second search string preview results while maintaining the concurrent displaying of the first contents of the shopping cart.

4. The system of claim 1, wherein the instructions, when executed by the processor, further cause the processor to:
receive from the input device a selection by the user of one of the first contents of the shopping cart to remove from the shopping cart;
process the selection by the user concurrently with displaying the search box and the first search string preview results on the display device, comprising:
removing the user's selection from the first selected items to produce second selected items; and
manipulating the display device to overlay the first contents of the shopping cart with second contents of the shopping cart concurrently with the first search string preview results, the second contents of the shopping cart comprising said consistently sized and arranged presentations of corresponding said second selected items for purchase from the shopping site.

5. The system of claim 1, further comprising a plurality of electronic shopping carts including the shopping cart, wherein the instructions, when executed by the processor, further cause the processor to:
manipulate the display device to overlay a list of the electronic shopping carts concurrently with, above or below, and contiguous to, the first search string preview results, the first contents of the shopping cart, or the search box, the overlaid list of the electronic shopping carts comprising consistently sized and arranged presentations of corresponding summaries of the electronic shopping carts;
receive from the input device a selection by the user of a different one of the electronic shopping carts; and
process the selection by the user concurrently with displaying the search box and the first search string preview results on the display device, comprising:
manipulating the display device to overlay the first contents of the shopping cart with corresponding contents of the different one of the electronic shopping carts.

6. The system of claim 1, wherein the instructions, when executed by the processor, further cause the processor to:
receive from the input device a selection by the user to proceed to checkout processing of the shopping cart from within the first contents of the shopping cart on the display device concurrently with the overlaying of the first search string preview results on the display device; and
proceed to the checkout processing of the shopping cart.

7. The system of claim 1, wherein
a displayable size of the first contents of the shopping cart exceeds a size of a designated portion of the display device, and
the instructions, when executed by the processor, further cause the processor to:
manipulate the display device to overlay a first portion of the first contents of the shopping cart on the designated portion of the display device concurrently with overlaying the first search string preview results on the display device;
receive from the input device a selection by the user to display a second portion of the first contents of the shopping cart; and
manipulate the display device to overlay the second portion of the first contents of the shopping cart on the designated portion of the display device concurrently with overlaying the first search string preview results on the display device.

8. The system of claim 1, wherein
a displayable size of the search string preview results exceeds a size of a designated portion of the display device, and
the instructions, when executed by the processor, further cause the processor to:
break up the first search string preview results into portions of no more than a second number of the first search string preview results, the second number being smaller than the first number;
manipulate the display device to overlay a first portion of the portions of the first search string preview results on the designated portion of the display device concurrently with overlaying the first contents of the shopping cart on the display device;
receive from the input device a selection by the user to display a second portion of the portions of the first search string preview results; and
manipulate the display device to overlay the second portion of the portions of the first search string preview results on the designated portion of the display device concurrently with overlaying the first contents of the shopping cart on the display device.

9. A method of electronic shopping with an electronic shopping cart on a system comprising a computer processor, a network interface configured to connect the processor to an electronic shopping site and to a search box of the shopping site, and to shop and select items for purchase at the shopping site using the electronic shopping cart, the shopping cart comprising the selected items for purchase from the shopping site, an input device configured to receive a search string from a user through the search box of the shopping site, and a display device configured to display the search box of the shopping site and search string preview results of the shopping site as a first extension of the search box to the user as the user enters the search string in the input device, and to display contents of the shopping cart as a second extension of the search box concurrently with the search string preview results, the method comprising:

receiving by the processor from the input device a first partial search string entered by the user in the search box;

processing by the processor the first partial search string concurrently with the entering of the search string by the user in the search box, comprising:

identifying first search results from the shopping site relevant to the first partial search string;

selecting a first number of the relevant first search results; and selecting two or more fields including a name, title, or description of each of the first number of the selected relevant first search results to display in corresponding relevant first said search string preview results for display on the display device, the two or more fields representing a summary of a corresponding one of the search results from the shopping site;

manipulating by the processor the display device to overlay the first number of the selected relevant first search string preview results above or below, and contiguous to, the search box, the first search string preview results being consistently sized and arranged presentations of their corresponding two or more fields; and manipulating by the processor the display device to further overlay first contents of the shopping cart concurrently with, above or below, and contiguous to, the first search string preview results or the search box, the first contents of the shopping cart comprising consistently sized and arranged presentations of corresponding first said selected items for purchase from the shopping site.

10. The method of claim 9, further comprising:

receiving by the processor from the input device a selection by the user of one of the first search string preview results to add to the shopping cart for purchase from the shopping site; and processing by the processor the selection by the user concurrently with displaying the search box and the first search string preview results on the display device, comprising:

adding the user's selection to the first selected items to produce second selected items; and manipulating the display device to overlay the first contents of the shopping cart with second contents of the shopping cart concurrently with the first search string preview results, the second contents of the shopping cart comprising consistently sized and arranged presentations of corresponding said second selected items for purchase from the shopping site.

11. The method of claim 9, further comprising:

receiving by the processor from the input device a further portion of the search string entered by the user in the search box, the further portion of the search string combining with the first partial search string to form a second partial search string; and processing by the processor the second partial search string concurrently with the entering of the search string by the user in the search box, comprising:

identifying second search results from the network application relevant to the second partial search string;

selecting the first number of the relevant second search results;

selecting the two or more fields of each of the first number of selected relevant second search results to display in corresponding relevant second said search string preview results for display on the display device; and manipulating the display device to overlay the first search string preview results with the second search string preview results while maintaining the concurrent displaying of the first contents of the shopping cart.

12. The method of claim 9, further comprising:

receiving by the processor from the input device a selection by the user of one of the first contents of the shopping cart to remove from the shopping cart;

processing by the processor the selection by the user concurrently with displaying the search box and the first search string preview results on the display device, comprising:

removing the user's selection from the first selected items to produce second selected items; and manipulating the display device to overlay the first contents of the shopping cart with second contents of the shopping cart concurrently with the first search string preview results, the second contents of the shopping cart comprising said consistently sized and arranged presentations of corresponding said second selected items for purchase from the shopping site.

13. The method of claim 9, wherein the system further comprises a plurality of electronic shopping carts including the shopping cart, and the method further comprises:

manipulating by the processor the display device to overlay a list of the electronic shopping carts concurrently with, above or below, and contiguous to, the first search string preview results, the first contents of the shopping cart, or the search box, the overlaid list of the electronic shopping carts comprising consistently sized and arranged presentations of corresponding summaries of the electronic shopping carts;

receiving by the processor from the input device a selection by the user of a different one of the electronic shopping carts; and processing by the processor the selection by the user concurrently with displaying the search box and the first search string preview results on the display device, comprising:

manipulating the display device to overlay the first contents of the shopping cart with corresponding contents of the different one of the electronic shopping carts.

14. The method of claim 9, further comprising:

receiving by the processor from the input device a selection by the user to proceed to checkout processing of the shopping cart from within the first contents of the shopping cart on the display device concurrently with the overlaying of the first search string preview results on the display device; and proceeding by the processor to the checkout processing of the shopping cart.

15. The method of claim 9, wherein a displayable size of the contents of the shopping cart exceeds a size of a designated portion of the display device, the method further comprising:

manipulating by the processor the display device to overlay a first portion of the first contents of the shopping cart on the designated portion of the display device concurrently with overlaying the first search string preview results on the display device;

receiving by the processor from the input device a selection by the user to display a second portion of the first contents of the shopping cart; and manipulating by the processor the display device to overlay the second portion of the first contents of the shopping cart on the designated portion of the display device concurrently with overlaying the first search string preview results on the display device.

16. The method of claim 9, wherein a displayable size of the search string preview results exceeds a size of a designated portion of the display device, the method further comprising:

breaking up by the processor the first search string preview results into portions of no more than a second number of the first search string preview results, the second number being smaller than the first number;

manipulating by the processor the display device to overlay a first portion of the portions of the first search string preview results on the designated portion of the display device concurrently with overlaying the first contents of the shopping cart on the display device;

receiving by the processor from the input device a selection by the user to display a second portion of the portions of the first search string preview results; and manipulating by the processor the display device to overlay the second portion of the portions of the first search string preview results on the designated portion of the display device concurrently with overlaying the first contents of the shopping cart on the display device.

* * * * *